US012735999B2

(12) United States Patent
Jansen et al.

(10) Patent No.: US 12,735,999 B2
(45) Date of Patent: Sep. 15, 2026

(54) TWO-PHASE THERMAL PUMP

(71) Applicant: Rolls-Royce North American Technologies Inc., Indianapolis, IN (US)

(72) Inventors: Eugene Charles Jansen, Stafford, VA (US); Jeffrey Wen-Yu Chen, San Diego, CA (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 19/061,874

(22) Filed: Feb. 24, 2025

(65) Prior Publication Data

US 2025/0188853 A1 Jun. 12, 2025

Related U.S. Application Data

(63) Continuation of application No. 18/112,915, filed on Feb. 22, 2023, now Pat. No. 12,264,601, which is a (Continued)

(51) Int. Cl.

*F01K 25/10* (2006.01)
*F01K 3/02* (2006.01)

(Continued)

(52) U.S. Cl.

CPC ................ *F01K 25/10* (2013.01); *F01K 3/02* (2013.01); *F01K 3/16* (2013.01); *F01K 9/02* (2013.01);

(Continued)

(58) Field of Classification Search

CPC .......... F01K 25/08; F01K 25/10; F01K 3/004; F01K 3/02; F01K 3/08; F01K 3/14;

(Continued)

(56) References Cited

U.S. PATENT DOCUMENTS 1,942,944 A 1/1934 Smith
1,943,047 A 1/1934 Updegraff (Continued)

FOREIGN PATENT DOCUMENTS

EP 2813746 A1 12/2014
EP 2837873 A2 2/2015

(Continued)

OTHER PUBLICATIONS

Krainz et al. "Development of Automotive Liquid Hydrogen Storage Systems" Jul. 16, 2004 (Year: 2004.

(Continued)

*Primary Examiner* — Loren C Edwards
(74) *Attorney, Agent, or Firm* — Barnes & Thornburg

(57) ABSTRACT

A thermal system includes a tank storing a cooling fluid in a liquid state and a gas state, a first heat exchanger releasing heat into the tank, a second heat exchanger fluidly downstream of the fluid storage tank and exchanging heat between the cooling fluid and a heat load, a turbine fluidly downstream of the second heat exchanger and extracting mechanical energy from the cooling fluid, and a combustor fluidly upstream of the turbine and fluidly downstream of the second heat exchanger. The cooling fluid that has been heated by the second heat exchanger passes through the first heat exchanger and thereby heats upstream cooling fluid resident in the fluid storage tank, and the combustor is configured to ignite the cooling fluid flowing from the second heat exchanger such that combusted cooling fluid flows through and drives the turbine.

20 Claims, 15 Drawing Sheets

Related U.S. Application Data continuation of application No. 16/611,932, filed as application No. PCT/US2018/033543 on May 18, 2018, now Pat. No. 11,619,146.

(60) Provisional application No. 62/508,074, filed on May 18, 2017.

(51) Int. Cl.

| | |
|---|---|
| ***F01K 3/16*** | (2006.01) |
| ***F01K 9/02*** | (2006.01) |
| ***F17C 7/04*** | (2006.01) |
| *F01K 27/00* | (2006.01) |

(52) U.S. Cl.

CPC ................ *F17C 7/04* (2013.01); *F01K 27/00* (2013.01); *F17C 2221/014* (2013.01); *F17C 2223/0161* (2013.01); *F17C 2250/0626* (2013.01)

(58) Field of Classification Search

CPC ..... F01K 3/16; F01K 3/18; F01K 3/26; F01K 3/262; F01K 9/00; F01K 9/02; F01K 11/00; F01K 11/02; F01K 13/00; F01K 13/02; F01K 17/00; F01K 17/06; F01K 21/00; F01K 21/005; F01K 27/00; F17C 7/04; F17C 2221/014; F17C 2223/0146; F17C 2223/0153; F17C 2223/0161; F02C 1/04; F02C 1/05; F02C 1/06; F02C 3/00; F02C 3/14; F02C 3/20; F02C 3/22; F02C 3/24; F02C 3/36; F02C 3/365; F02C 6/00; F02C 6/04; F02C 6/10; F02C 6/14; F02C 6/20; F02C 6/203; F02C 6/206; F02C 7/22; F02C 7/224

See application file for complete search history.

(56) References Cited

U.S. PATENT DOCUMENTS

| | | | | |
|---|---|---|---|---|
| 1,943,059 | A | 1/1934 | Dana | |
| 2,842,942 | A | 7/1958 | Johnston | |
| 2,925,712 | A * | 2/1960 | Johnson | F02C 7/224 60/785 |
| 3,080,716 | A * | 3/1963 | Cummings | F02C 7/14 60/39.83 |
| 3,650,290 | A | 3/1972 | Moen | |
| 3,690,100 | A * | 9/1972 | Wolf | F02C 7/08 60/206 |
| 3,779,007 | A * | 12/1973 | Lavash | F02C 7/14 60/39.83 |
| 5,357,758 | A | 10/1994 | Andonian | |
| 5,373,700 | A | 12/1994 | McIntosh | |
| 5,590,535 | A | 1/1997 | Rhoades | |
| 5,644,921 | A | 7/1997 | Chowdhury | |
| 6,415,595 | B1 * | 7/2002 | Wilmot, Jr | F02C 7/224 60/785 |
| 6,634,178 | B1 | 10/2003 | Friedel | |
| 7,757,727 | B2 | 7/2010 | Handa | |
| 2007/0277533 | A1 | 12/2007 | Rech et al. | |
| 2009/0241558 | A1 | 10/2009 | Yuan et al. | |
| 2009/0308083 | A1 | 12/2009 | Brunner | |
| 2010/0005801 | A1 | 1/2010 | Negre et al. | |
| 2010/0031669 | A1 * | 2/2010 | Ensign | F02C 3/10 415/148 |
| 2010/0236259 | A1 | 9/2010 | Brunner et al. | |
| 2012/0326443 | A1 | 12/2012 | Ginter | |
| 2014/0000275 | A1 | 1/2014 | Kesseli et al. | |
| 2015/0007584 | A1 | 1/2015 | Brunner | |
| 2015/0072260 | A1 | 3/2015 | Brunner et al. | |
| 2015/0226093 | A1 | 8/2015 | Ayres et al. | |
| 2017/0009607 | A1 | 1/2017 | Cook et al. | |
| 2017/0012000 | A1 | 1/2017 | Tseng et al. | |
| 2018/0306383 | A1 | 10/2018 | Poag | |

FOREIGN PATENT DOCUMENTS

| | | | |
|---|---|---|---|
| EP | 3056694 | A1 | 8/2016 |
| GB | 1048448 | A | 11/1966 |

OTHER PUBLICATIONS

Michel et al. "Liquid Hydrogen Technologies for Mobile Use" Jun. 2006 (Year: 2006.

Extended European Search Report, European Application No. 18802898.9-1008, dated Jan. 18, 2021, 7 pages.

* cited by examiner

TWO-PHASE THERMAL PUMP

CROSS-REFERENCE TO RELATED APPLICATIONS

This application is a continuation application of co-pending U.S. patent application Ser. No. 18/112,915, which was filed on Feb. 22, 2023, which is a continuation application of U.S. Pat. No. 11,619,146, which was filed on Nov. 8, 2019, which is a U.S. national stage filing from International Application Number PCT/US2018/033543, which was filed on May 18, 2018, which is based upon and claims the benefit of priority from U.S. provisional patent application Ser. No. 62/508,074, which was filed on May 18, 2017. The disclosures of each of the above-identified patent applications are incorporated herein by reference in their entirety.

FIELD OF THE DISCLOSURE

Among other things, the present application relates to pumping fluid with heat.

BACKGROUND

In many cooling systems, a cooling fluid (which can be a liquid, a gas, and/or a vapor) receives heat from a heat source (e.g., a vehicle engine, warm air, a computer server). To preserve cooling fluid, the cooling systems are often closed, meaning that the cooling fluid circles the cooling system in a closed loop (i.e., the cooling fluid is sealed within the cooling system). The cooling fluid will often cycle between an evaporator (a heat exchanger where the cooling fluid accepts heat from the heat source) and a condenser (a heat exchanger where the cooling fluid rejects heat into another fluid, such as ambient air or ambient water).

Closed systems often incorporate a fluid pump (e.g., a gas compressor, a liquid pump, a wick) to cycle the cooling fluid within the system. Fluid pumps consume energy, can be expensive to maintain, and can be unreliable. Furthermore, closed systems refrain from consuming the cooling fluid (e.g., as fuel) since doing so would deplete the cooling power of the system.

Open (also called expendable) cooling systems can omit a fluid pump. In some open cooling systems, a tank of liquid nitrogen (often maintained at −196° C. on sea level) is connected to an evaporator. The cold nitrogen flows from the tank and into the evaporator, where the nitrogen accepts heat from a hot target.

Liquid nitrogen has a relatively small amount of latent heat, meaning that liquid nitrogen stored in the tank tends to vaporize into a gas. As a result, the tank often includes a relief valve, which releases vaporized liquid nitrogen into ambient. Although the relief valve can maintain saturation conditions within the tank (i.e., retain the majority of nitrogen in a liquid state), releasing vaporized nitrogen is wasteful. Furthermore, pure nitrogen cannot be combusted as fuel.

SUMMARY

A thermal system according to a first aspect of the present disclosure includes a fluid storage tank configured to store a cooling fluid in a liquid state and a gas state, a first heat exchanger configured to release heat into the fluid storage tank, a second heat exchanger, the second heat exchanger being fluidly downstream of the fluid storage tank, the second heat exchanger being configured to exchange heat between the cooling fluid and a heat load, a turbine arranged fluidly downstream of the second heat exchanger, the turbine configured to extract mechanical energy from the cooling fluid flowing therein, and a combustor arranged fluidly upstream of the turbine and fluidly downstream of the second heat exchanger. The cooling fluid that has been heated by the second heat exchanger can pass through the first heat exchanger and thereby heats upstream cooling fluid resident in the fluid storage tank, and the combustor is configured to ignite the cooling fluid flowing from the second heat exchanger such that combusted cooling fluid flows through and drives the turbine.

In some embodiments, the thermal system further includes a three-way valve fluidly upstream of the first heat exchanger and fluidly downstream of the second heat exchanger, the three-way valve being configured to direct the cooling fluid, after being heated by the heat load, toward the first heat exchanger and toward the turbine.

In some embodiments, the three-way valve includes an entrance, which receives the cooling fluid from the second heat exchanger, a first exit, which leads toward the first heat exchanger such that a first portion of the cooling fluid is directed toward the first heat exchanger via the first exit, and a second exit, which leads toward the turbines such that a second portion of the cooling fluid is directed toward the turbine via the second exit.

In some embodiments, the thermal system further includes a first fluid line extending from the second exit of the three-way valve to the turbine. The combustor can be arranged along the first fluid line such that the second portion of the cooling fluid flowing from the second exit is ignited by the combustor and flows through and drives the turbine.

In some embodiments, the thermal system further includes a pressure control device arranged fluidly downstream of the second heat exchanger along the first fluid line.

In some embodiments, the pressure control device is arranged fluidly upstream of the combustor and fluidly downstream of the three-way valve.

In some embodiments, the turbine is an aspect of an electrical power generator, the electrical power generator configured to convert mechanical energy supplied by the turbine into electrical energy, and the heat load further comprises heat produced during consumption of and/or generation of the electrical energy.

In some embodiments, the thermal system further includes a processing system configured to increase and decrease a flow rate of the cooling fluid arranged downstream of the second heat exchanger into the first heat exchanger to maintain a desired metric of the cooling fluid resident in the fluid storage tank, the desired metric being a temperature, a pressure, or a gas to liquid ratio of the resident cooling fluid.

In some embodiments, the processing system is further configured to increase and decrease a flow rate of the cooling fluid into the first heat exchanger to maintain a desired metric of the turbine.

In some embodiments, the desired turbine metric is a rotational speed.

According to a further aspect of the present disclosure, a thermal system includes a fluid storage tank configured to store a cooling fluid in a liquid state and a gas state, a first heat exchanger configured to release heat into the fluid storage tank, a second heat exchanger, the second heat exchanger being fluidly downstream of the fluid storage tank, the second heat exchanger being configured to exchange heat between the cooling fluid and a heat load, a turbine arranged fluidly downstream of the second heat exchanger, the turbine configured to extract mechanical energy from the cooling fluid flowing therein, and a combustor arranged fluidly upstream of the turbine and fluidly downstream of the second heat exchanger. The cooling fluid that has been heated by the second heat exchanger can pass through the first heat exchanger and thereby heats upstream cooling fluid resident in the fluid storage tank, the combustor is configured to ignite the cooling fluid flowing from the second heat exchanger, and a first portion of the combusted cooling fluid flows through and drives the turbine and a second portion of the combusted cooling fluid flows through the first heat exchanger to heat upstream cooling fluid resident in the fluid storage tank.

In some embodiments, the thermal system further includes a three-way valve fluidly upstream of the first heat exchanger and fluidly downstream of the second heat exchanger, the three-way valve being configured to direct the cooling fluid, after being heated by the heat load, toward the first heat exchanger and toward the turbine.

In some embodiments, the three-way valve includes an entrance, which receives the cooling fluid from the second heat exchanger, a first exit, which leads toward the first heat exchanger, and a second exit, which leads toward the turbine.

In some embodiments, the thermal system further includes a first fluid line extending from the second heat exchanger to the entrance of the three-way valve. The combustor can be arranged along the first fluid line, the first exit can direct the second portion of the combusted cooling fluid to the first heat exchanger such that the second portion flows through the first heat exchanger to heat upstream cooling fluid resident in the fluid storage tank, and the second exit can direct the first portion of the combusted cooling fluid to the turbine such that the second portion flows through and drives the turbine.

In some embodiments, the thermal system further includes a pressure control device arranged fluidly downstream of the three-way valve between the three-way valve and the turbine.

In some embodiments, the thermal system further includes an oxygen source arranged fluidly upstream of the combustor, the system being configured to mix oxygen dispensed from the oxygen source with the cooling fluid and to combust the mixture in the combustor.

According to a further aspect of the present disclosure, a method includes storing a cooling fluid in a fluid storage tank in a liquid state and a gas state, providing a first heat exchanger configured to release heat into the fluid storage tank, arranging a second heat exchanger fluidly downstream of the fluid storage tank, receiving the cooling fluid in the second heat exchanger to exchange heat between the cooling fluid and a heat load, arranging a turbine arranged fluidly downstream of the second heat exchanger, the turbine configured to extract mechanical energy from the cooling fluid flowing therein, arranging a combustor fluidly upstream of the turbine and fluidly downstream of the second heat exchanger, passing the cooling fluid that has been heated by the second heat exchanger through the first heat exchanger and thereby heating upstream cooling fluid resident in the fluid storage tank, and igniting the cooling fluid flowing from the second heat exchanger and to the turbine in the combustor such that combusted cooling fluid flows through and drives the turbine.

In some embodiments, the method further includes arranging a three-way valve fluidly upstream of the first heat exchanger and fluidly downstream of the second heat exchanger, the three-way valve being configured to direct the cooling fluid, after being heated by the heat load, toward the first heat exchanger and toward the turbine.

In some embodiments, the method further includes receiving the cooling fluid from the second heat exchanger at an entrance of the three-way valve, directing a first portion of the cooling fluid toward the first heat exchanger via a first exit of the three-way valve, and directing a second portion of the cooling fluid toward the turbine via a second exit of the three-way valve.

In some embodiments, the method further includes providing a first fluid line that extends from the second exit of the three-way valve to the turbine, and arranging the combustor along the first fluid line such that the second portion of the cooling fluid flowing from the second exit is ignited by the combustor and flows through and drives the turbine.

BRIEF DESCRIPTION OF THE DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, some Figures omit views of certain features. Features are shown schematically.

DETAILED DESCRIPTION OF THE DRAWINGS

Illustrative (i.e., example) embodiments are disclosed. The claims are not limited to the illustrative embodiments. Therefore, some implementations of the claims will have different features than in the illustrative embodiments.

Changes to the claimed inventions can be made without departing from their spirit. The claims are intended to cover implementations with such changes.

At times, the present application uses directional terms (e.g., front, back, top, bottom, left, right, etc.) to give the reader context when viewing the Figures. Directional terms do not limit the claims. Any directional term can be replaced with a numbered term (e.g., left can be replaced with first, right can be replaced with second, and so on). Furthermore, any absolute term (e.g., high, low, etc.) can be replaced with a corresponding relative term (e.g., higher, lower, etc.).

Figure 1:
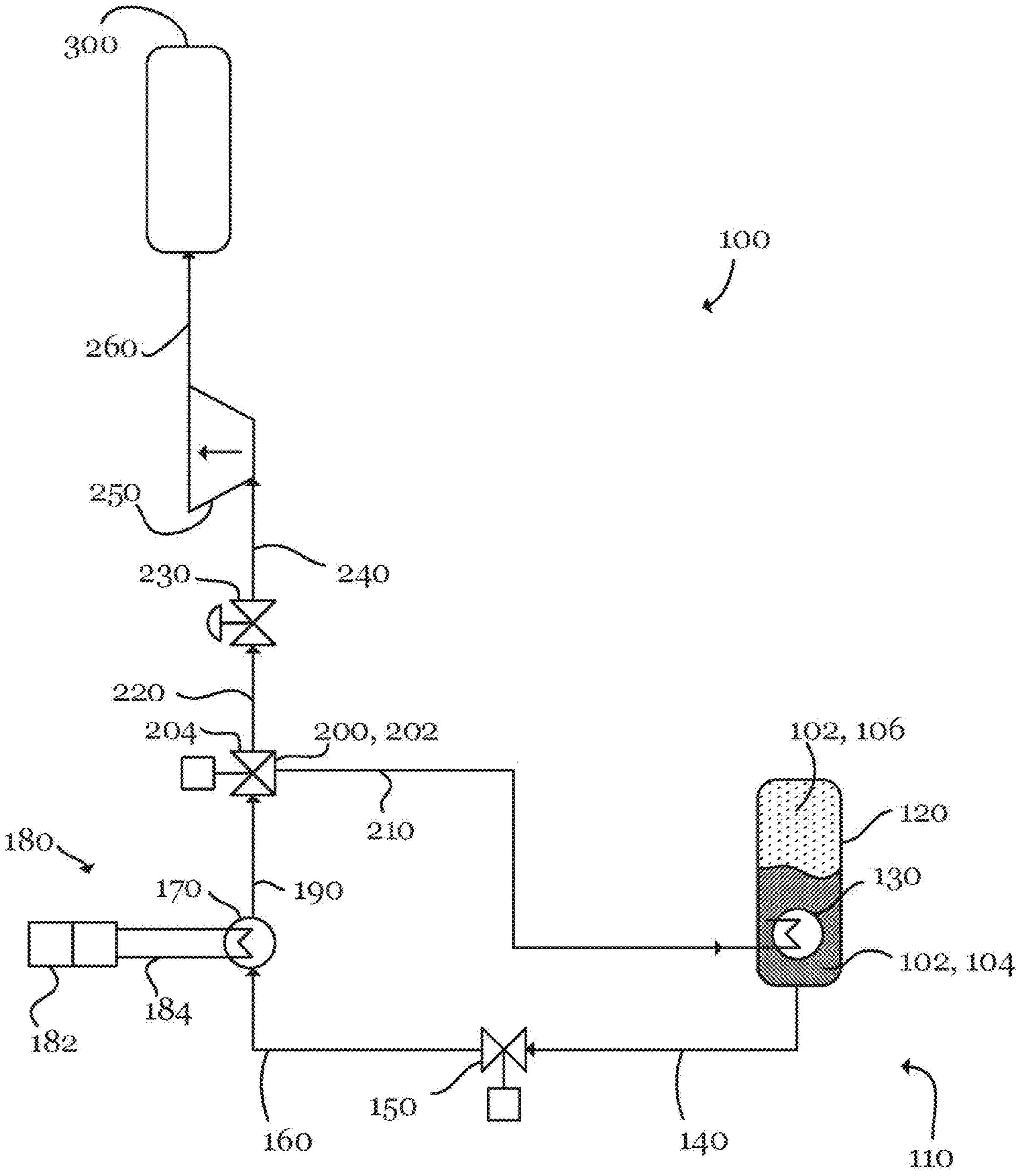
FIG. 1 illustrates an exemplary thermal system.

FIG. 1 shows a thermal system 100 (also called a system, a thermal management system, an energy production system, a dual-use system, etc.). Thermal system 100 can include a fluid vessel no. Fluid vessel 110 can include (a) fluid storage tank 120 configured to store a cooling fluid 102 (also called a working fluid) in a liquid state 104 and/or a gas state 106, (b) a first heat exchanger 130 (which can be, for example, an electrical heater), (c) a fluid line 140 configured to flow fluid from fluid storage tank 120, and (d) a flow control valve 150. First heat exchanger 130 can be configured to exchange heat with cooling fluid 102 within fluid storage tank 120. Thermal system 100 of FIG. 1 can include the features disclosed below, including those disclosed with reference to any of FIGS. 2-17 (i.e., the remaining Figures).

Cooling fluid 102 can be a cryogenic cooling fluid, such as cryogenic oxygen, cryogenic nitrogen, cryogenic natural gas, and the like. Thus, the liquid phase 104 of cooling fluid 102 resident in fluid storage tank 120 can be liquid oxygen, liquid nitrogen, liquid natural gas (LNG), and the like. The gas phase 106 of cooling fluid 102 resident in fluid storage tank 120 can be maintained at the boiling temperature of the liquid phase cooling fluid 104. Gas phase cooling fluid 106 resident in fluid storage tank 120 can be in a saturated state and thus maintained at the saturation temperature of liquid phase cooling fluid 104 in storage tank 120. At least a portion of liquid phase cooling fluid 104 in fluid storage tank 120 can be at a sub-cooled temperature. Cooling fluid 102 does not need to be at a cryogenic temperature. According to some embodiments, cooling fluid 102 is water or another refrigerant (e.g., R-407A, R-22) at a non-cryogenic temperature.

First heat exchanger 130 can be configured to heat (e.g., boil) cooling fluid 102 resident in fluid storage tank 120 to build a desired pressure level therein. More specifically, first heat exchanger 130 can boil liquid cooling fluid 104 into gaseous cooling fluid 106 to build pressure within fluid storage tank 120. The pressure build within fluid storage tank 120 (i.e., within fluid vessel 100) can motivate fluid toward the other components of thermal system 100 (discussed below). As used herein, the term "heat" can include a heat transfer, but not necessarily a change in temperature, since the heat transfer can produce a change in phase (e.g., liquid to gas) without any change in temperature.

First heat exchanger 130 can be disposed within fluid storage tank 120. First heat exchanger 130 can be in thermal communication with fluid storage tank 120. First heat exchanger 130 can include a series of fluid lines and/or heat exchanger plates running through the liquid phase cooling fluid 104 within tank 120.

Figure 2:
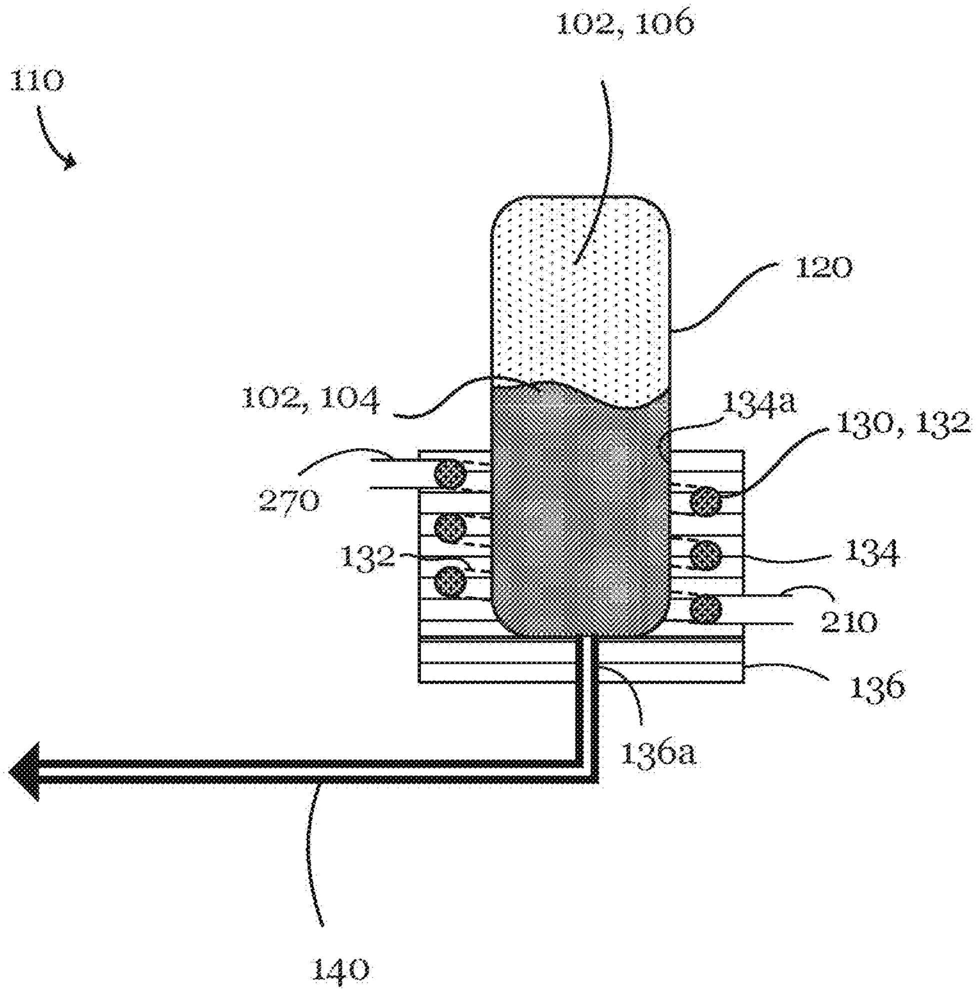
FIG. 2 illustrates exemplary features of a fluid vessel of the thermal system in elevational cross section. Features shown in broken lines are hidden.

Alternatively, or in addition, first heat exchanger 130 can wrap about an outer surface of fluid storage tank 120. Referring to FIG. 2, first heat exchanger 130 can include a helically coiled tube 132. Tube 132 can extend about (e.g., wrap about, coil about) an outer circumference of fluid storage tank 120. With continued reference to FIG. 2, first heat exchanger 130 can include a stand 134. Stand 134 can include a holding portion 136 and a base portion 138. Holding portion 136 can house coiled tube 132. Holding portion 136 can define a cylindrical holding aperture 136 *a* with a diameter matching (i.e., being substantially equal to) an outer diameter of fluid storage tank 132. Base portion 138 can serve as a stand on which a lower end of storage tank 120 rests. Base portion 138 can define a through hole 138 *a* for accommodating line 140.

As further discussed below, first heat exchanger 130 can use cooling fluid 102 heated by second heat exchanger 170 to heat cooling fluid 102 resident in vessel 110. Alternatively, or in addition, first heat exchanger 130 can use electrical energy to heat cooling fluid 102 resident in vessel 102. For example, and according to some embodiments, instead of carrying warm cooling fluid 102, tubes 132 can be resistive electrical elements configured to convert electrical current into heat.

Figure 3:
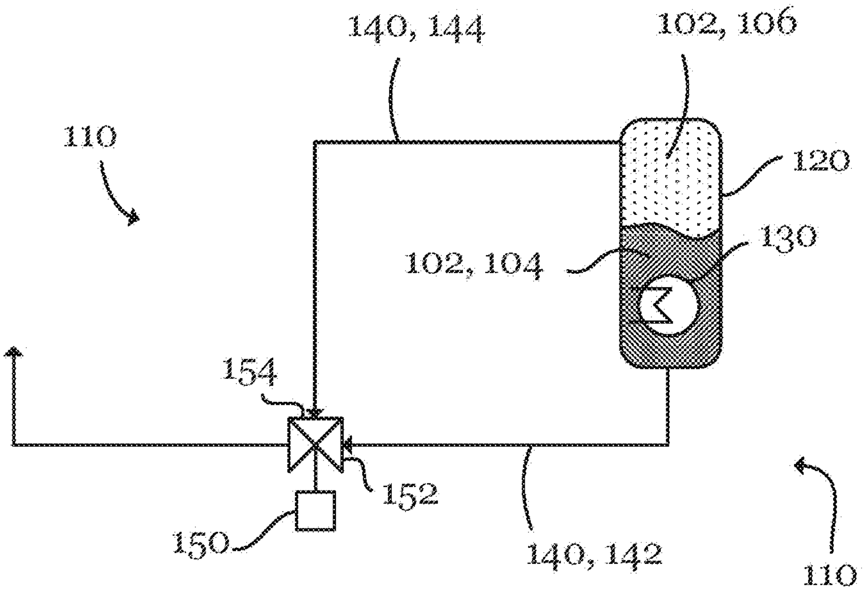
FIG. 3 illustrates exemplary features of the fluid vessel.

Flow control valve 150 can modulate the rate of cooling fluid 102 departing fluid vessel 110. As shown in FIG. 1, fluid line 140 can be placed to exclusively receive subcooled liquid phase cooling fluid 104. Alternatively, and as shown in FIG. 3, a plurality of fluid lines 140 can extend from storage tank 120. A first fluid line 142 can be placed at the bottom of fluid storage tank 120 and be configured to exclusively receive liquid phase cooling fluid 104. A second fluid line 144 can be placed at the top of fluid storage tank 120 and be configured to exclusively receive gas phase cooling fluid 106.

Thus, and as shown in FIG. 3, flow control valve 150 can be a three-way valve. The opening degree of a first entrance 152 can determine the rate at which liquid phase cooling fluid 104 departs fluid storage vessel 110. The opening degree of a second entrance 154 can determine the rate at which gas phase cooling fluid 106 departs fluid storage vessel 110.

As used herein, a three-way valve can be a single-piece three-way valve or a collection of two-way valves arranged to emulate a unitary three-way valve. As used herein, each opening of each three-way valve can be independently controllable. Alternatively, at least some (e.g., all) openings of three-way valves can be fixed. Therefore, as used herein, a three-way valve can be a T-junction. According to some embodiments, three-way valve 200 (e.g., three-way valves 200 *a*, 200 *b*, as further discussed below, are T-junctions).

Figure 4:
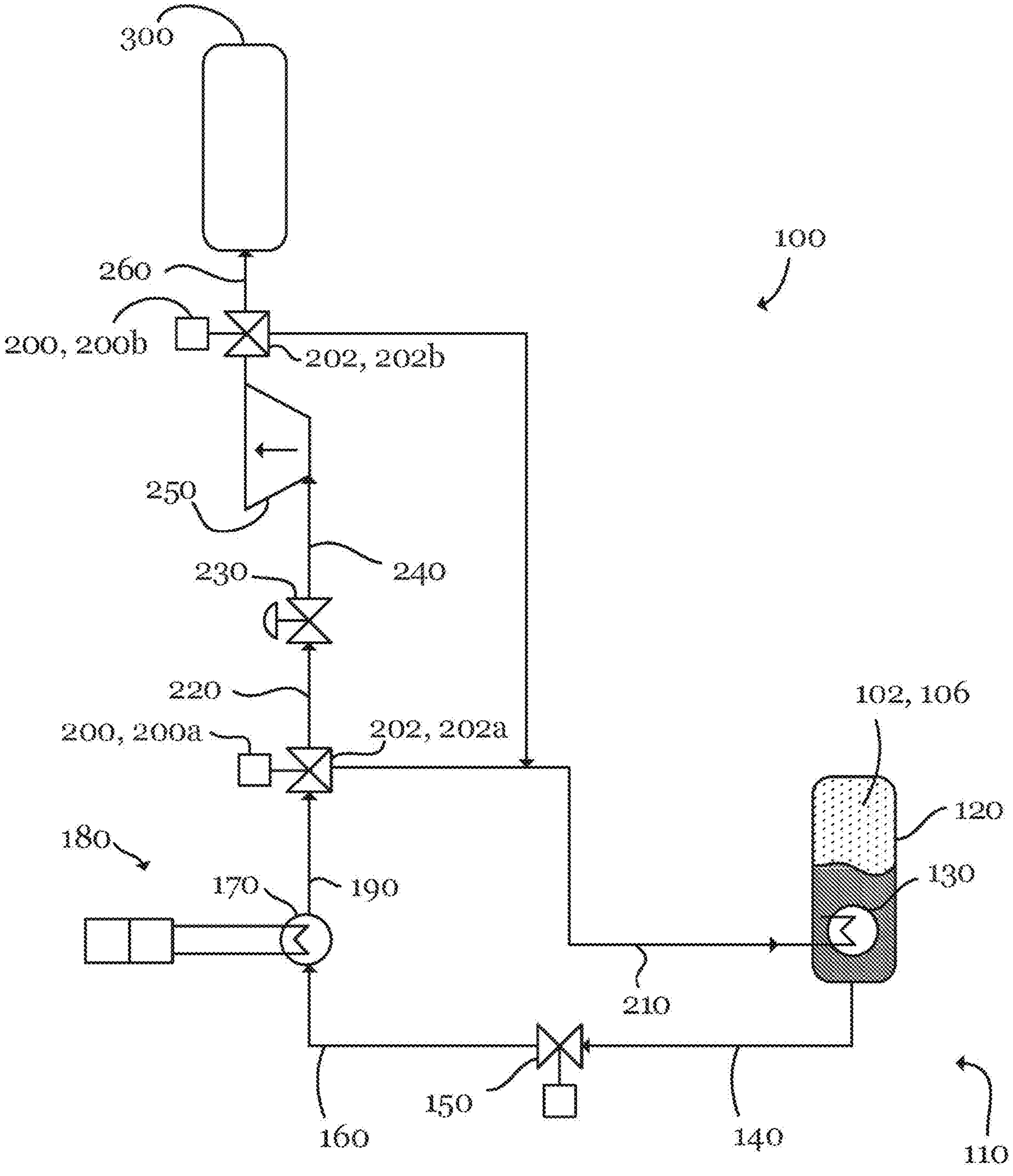
FIG. 4 illustrates exemplary features of the thermal system.

With reference to FIG. 4, cooling fluid 102 departing vessel 110 can flow through fluid line 160 into second heat exchanger 170. Second heat exchanger 170 can exchange heat between cooling fluid 102 and a heat source 180 (i.e., heat source 180 can release heat into cooling fluid 102). Heat source 180 is further discussed below, but can be, for example, a computer server, a vehicle engine, air flowing through a duct, etc.

Cooling fluid 102 can directly exchange heat with the heat-producing element 182 in heat source 180 (e.g., cooling fluid 102 can flow through tubes in contact with a computer processor, cooling fluid 102 can flow through a vehicle engine). Alternatively, or in addition, and as shown in FIG. 1, heat-producing elements 182 in heat source 180 can reject heat into a closed cooling loop 184 carrying a secondary refrigerant (e.g., water, R-22, etc.) and the refrigerant can exchange heat with cooling fluid 102 within second heat exchanger 170 (e.g., second heat exchanger 170 can simultaneously serve as a condenser of closed cooling loop 184 and an evaporator of cooling fluid 102).

Second heat exchanger 170 can therefore be a single-fluid heat exchanger (as in the case where cooling fluid 102 flows through tubes contacting a heat-producing element 182) or second heat exchanger 170 can be a dual-fluid (e.g., a counter-flow shell and tube) heat exchanger (as in the case where cooling fluid 102 directly exchanges heat with the secondary refrigerant flowing in closed loop 184). Via second heat exchanger 170, heat source 180 can reject heat into cooling fluid 102. Thus, cooling fluid 102 can depart heat source 180 as heated (e.g., warmed). Additional exemplary features of second heat exchanger 170 are discussed below with reference to FIGS. 13 and 14.

According to some embodiments, cooling fluid 102 departs second heat exchanger 170 at a temperature in excess of its saturated vapor temperature. Cooling fluid 102 can depart second heat exchanger 170 in a gaseous state. Cooling fluid 102 can depart second heat exchanger 170 in a saturated state. Cooling fluid 102 can depart second heat exchanger 170 as a super-heated and/or saturated gas. Cooling fluid 102 can depart second heat exchanger 170 at a temperature closer to the temperature of heat source 182 than the temperature of liquid phase fluid 104 in fluid storage tank 120.

Referring to FIG. 1, a fluid line 190 can carry heated cooling fluid 102 from second heat exchanger 170 to a three-way valve 200 (as discussed above, "three-way valve" is intended to encompass a collection of discrete two-way valves arranged to emulate a unitary three-way valve). Three-way valve 200 can include a first exit 202 and a second exit 204. First exit 202 can lead the heated cooling fluid 102 to first heat exchanger 130 (e.g., to coil 132 as shown in FIG. 2) by way of fluid line 210. Second exit 204 can lead the heated cooling fluid 102 to a pressure control valve 230 by way of fluid line 220. Pressure control valve 230 can be modulated to maintain a predetermined saturation pressure and/or temperature of cooling fluid 102 within second heat exchanger 170 and/or first heat exchanger 130.

By flowing through fluid line 210 into first heat exchanger 130, cooling fluid 102 warmed (i.e., heated) by heat source 180 can heat cooling fluid 102 resident in fluid storage tank 120. Through this heating, the resident cooling fluid 102 can boil from a liquid phase 104 into a gas phase 106 (e.g., a saturated vapor gas phase) and thereby increase pressure within fluid storage tank 120 (i.e., within fluid vessel 110). The increased pressure within fluid storage tank 120 can push cooling fluid 102 (e.g., liquid cooling fluid flowing through line 140) out of fluid storage tank 120 and toward second heat exchanger 170). Thus, the heat imparted by warmed cooling fluid 102 via first heat exchanger 130 can serve as a pumping force for cold cooling fluid 102 resident in fluid vessel 110.

According to some embodiments, no mechanical pumping force is exerted on cooling fluid 102 resident in thermal system 100 (or at least cooling fluid 102 resident in thermal system upstream of three-way valve 200 and/or at least cooling fluid 102 resident in thermal system 100 upstream of second heat exchanger 170). Instead, the pumping force can be exclusively provided by (a) thermal heat transfer from heat source 180 into cooling fluid 102 and (b) thermal transfer from warm (i.e., heated) cooling fluid 102 flowing through first heat exchanger 130 by way of line 210 to cold (i.e., unheated) cooling fluid 102 resident in fluid storage tank 120 (i.e., fluid vessel 110). Thus, according to some embodiments, no mechanical pump (i.e., no mechanical compressor and no mechanical liquid pump) exists in system 100 that directly interacts with cooling fluid 102 (a mechanical liquid pump and/or gas compressor may interact with the refrigerant resident in closed cooling loop 184).

According to other embodiments, a mechanical liquid pump and/or a mechanical gas compressor can be provided to, for example, supplement the thermal pumping force with mechanical pumping force. According to some embodiments, first heat exchanger 130 is not present and pumping force is primarily provided by a mechanical liquid pump and/or a mechanical gas compressor.

Although three-way valve 200 is shown as being disposed directly between fluid lines 190 and 220, three-way valve 200 can be provided at other locations. For example, three-way valve 200 can be disposed at any location downstream of second heat exchanger 170. According to some examples, three-way valve 200 is disposed in line 240 or in line 260.

According to some embodiments, and as shown in FIG. 4, a plurality of three-way valves 200 are included. A first three-way valve 200 *a* can be disposed as shown in FIG. 1. A second three-way valve 200 *b* can be disposed at any location fluidly downstream of first three-way valve 200 (e.g., in line 260). Fluid flowing through exits 202, 202 *a*, 202 *b* of three-way valves 200, 200 *a*, 200 *b* can meet at line 210, which can be a point fluidly upstream of first heat exchanger 130.

Figure 5:
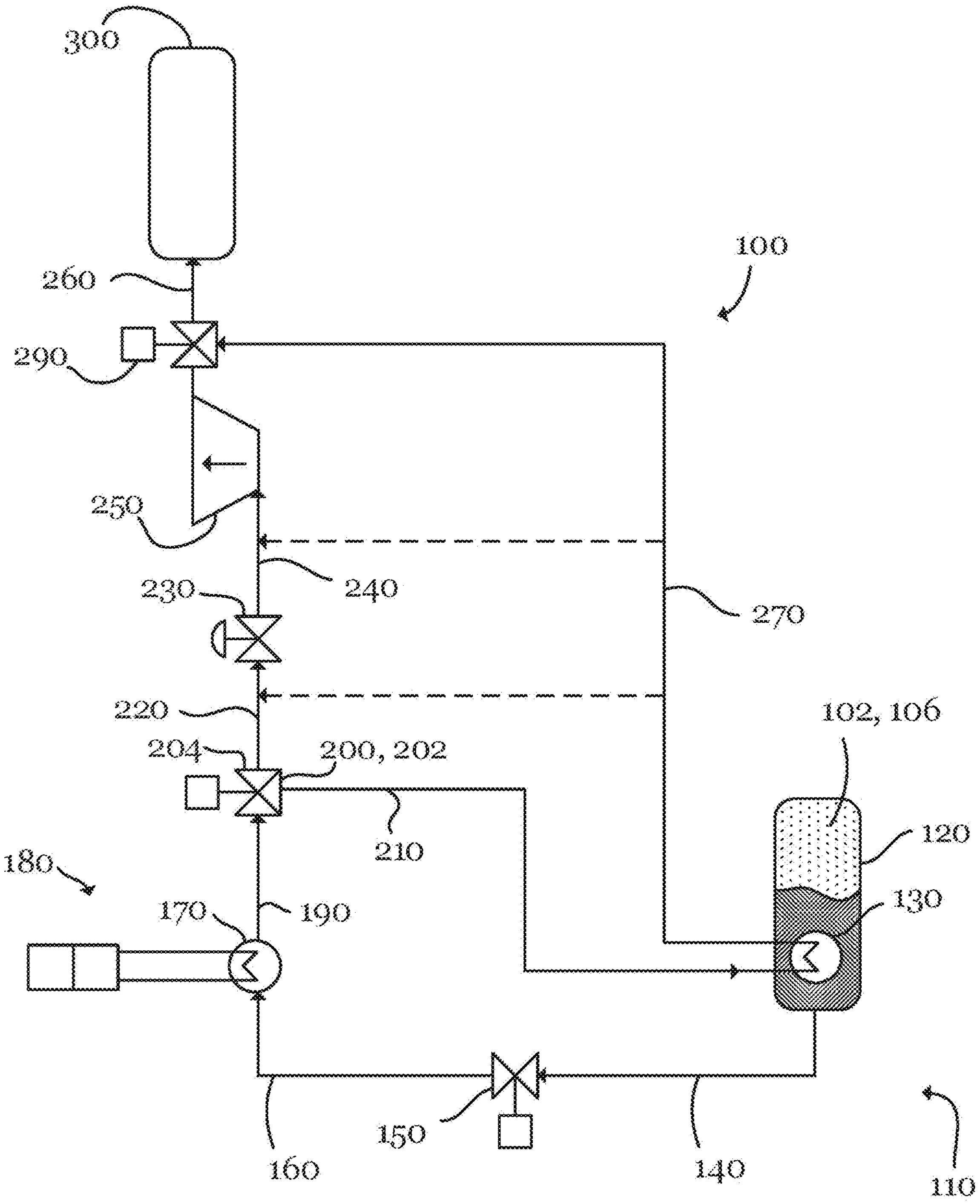
FIG. 5 illustrates exemplary features of the thermal system.

Referring now to FIG. 5, cooling fluid 102 can depart first heat exchanger through line 270. Line 270 can join line 260 via three-way valve 290 (e.g., a T-junction). Three-way valve 290 can thus intake fluid flowing through line 270 and the portion of line 260 upstream of three-way valve 290 and expel the mixture toward exhaust 300. Three-way valve 290 can be disposed fluidly upstream of three-way valve mob (if provided-see FIG. 4). As shown with broken lines, line 270 can join line 220 or line 240 and three-way valve 290 can be re-positioned accordingly (i.e., three-way valve 290 can be disposed in line 220 or line 240). As previously discussed, any three-way valve disclosed herein can be a fixed T-junction.

According to some embodiments, all three positions of three-way valve 290 are provided (i.e., one three-way valve is positioned as shown in FIG. 5, another is positioned at the intersection of line 270 and line 240, and another is positioned at the intersection of line 270 and line 220). According to these embodiments, cooling fluid 102, after passing through first heat exchanger 130, can depart line 270 into line 220, line 240, and/or line 260.

Referring to FIG. 1, pressure control device 230 can be, for example, an expansion valve configured to expand cooling fluid 102. Pressure control device 230 can expand cooling fluid 102 to ensure that all cooling fluid entering turbine 250 is in a gas phase. As with all components disclosed herein, pressure control device 230 is optional.

Fluid line 240 can carry cooling fluid 102 from pressure control device 230 to turbine 250. As discussed below with reference to FIGS. 6 and 7, turbine 250 can be an aspect of a power production device 310 (also called an electrical power generator). Cooling fluid 102 can drive (i.e., rotate) turbine 250 as cooling fluid 102 is expanded therein. Cooling fluid 102 can depart turbine 250 via line 260, wherein cooling fluid 102 can flow through first heat exchanger 130 (if, for example, second three-way valve 200 *b* is provided). Line 260 can terminate at exhaust 300. Turbine 250 can be, for example, a positive displacement, radial, or centrifugal turbine.

Referring to FIG. 1, exhaust 300 can be ambient environment. Exhaust 300 can be a cylinder in which cooling fluid 102 is stored. Exhaust 300 can be a downstream user of cooling fluid 102. For example, exhaust 300 can be an engine (e.g., a vehicle engine) configured to combust cooling fluid 102. According to some embodiments, exhaust 300 is a secondary turbine and an aspect of power generation device 310 (see FIG. 6).

Figure 6:
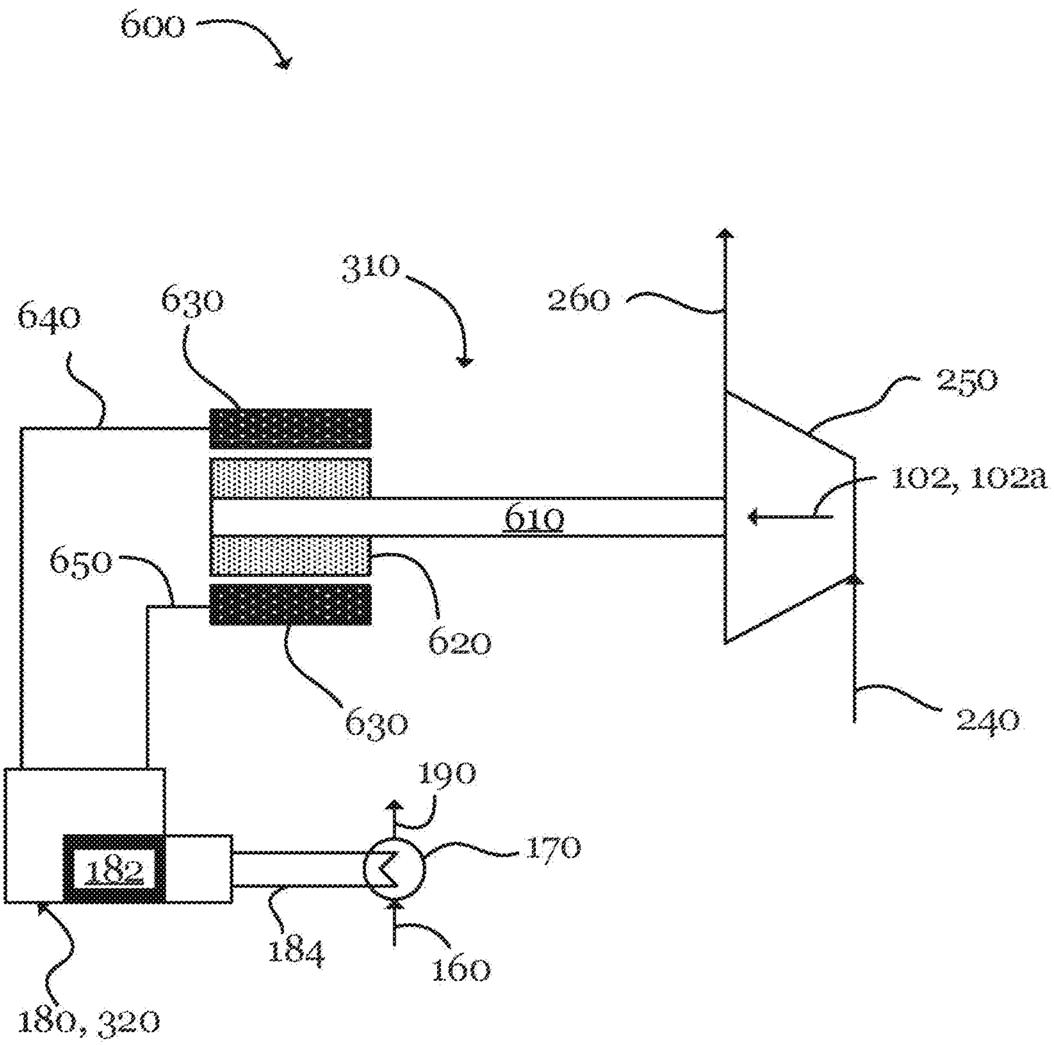
FIG. 6 illustrates an exemplary electrical apparatus of the thermal system. Stippled features are shown in elevational cross section.

Referring now to FIG. 6, an electrical apparatus 600 is shown. Apparatus 600 can include power generation device 310 (also called a power production device) and power consumption device 320 (e.g., heat source 180). Power generation device 310 can be configured to generate electrical energy from mechanical energy. Power generation device 310 can include turbine 250. Power consumption device 320 can be configured to consume the generated electrical energy. Power consumption device 320 can include heat producing element 182. Thus, second heat exchanger 170 can be used to cool power consumption device 320.

More specifically, and referring to FIG. 6, un-combusted cooling fluid 102 *a* can flow through turbine 250. As cooling fluid 102 expands, cooling fluid 102 can drive turbine blades (not shown). The turbine blades (not shown) can be mechanically coupled to driveshaft 610. A magnet 620 can be disposed along driveshaft 610. A fixed coil 630 (e.g., of copper) can be disposed about magnet 620. The rotation of magnet 620 can produce a fluctuating magnetic field, which can cause electrical current flow in coil 630. The electrical current can flow through electrical line 640 into power consumption device 320 (e.g., a vehicle motor, a computer server), and specifically into heat producing element 182 (e.g., a microprocessor). Heat producing element 182 can be cooled via second heat exchanger 170. Electrical line 650 can carry electrical current back to coil 630 to complete the electrical circuit.

Figure 7:
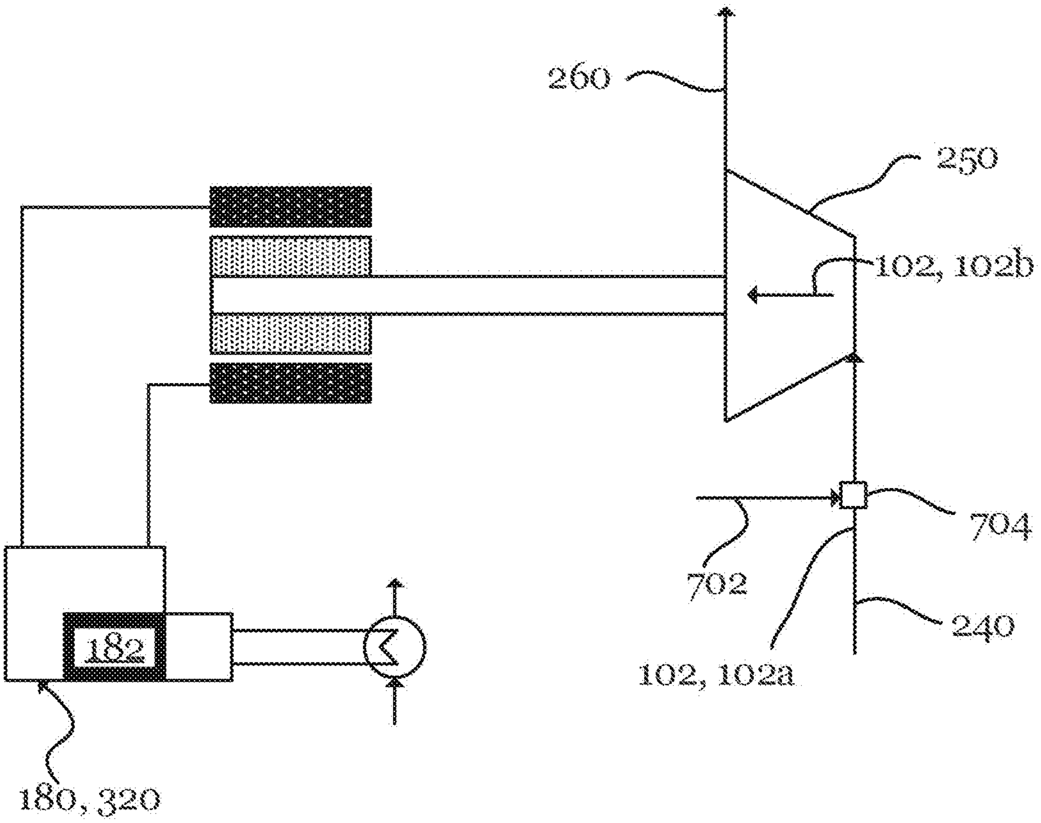
FIG. 7 illustrates exemplary features of the electrical apparatus. Stippled features are shown in elevational cross section.

Referring to FIG. 7, thermal system 100 can include an oxygen source (e.g., an air intake) 702 configured to reject oxygen into a combustor 704 (e.g., a combustion chamber including a spark plug) immediately upstream of turbine 250. Thus, combusted cooling fluid 102, 102 *b* produced by the ignition of cooling fluid 102 and the oxygen source can drive turbine 250. According to some embodiments, combusted cooling fluid 102 *b* is used to heat cooling fluid 102 resident in vessel 110 (e.g., via three-way valve 200, 200 *b*).

According to some embodiments (not shown), heat producing element 182 is a component of turbine 250 (e.g., a bearing, a gearbox) and thus second heat exchanger 170 is used to cool turbine 250. According to some embodiments (not shown), turbine 250 is absent and power generation device 310 uses alternate means to extract energy from cooling fluid 102. Power generation device 310 can be a fuel-cell.

Figure 13:
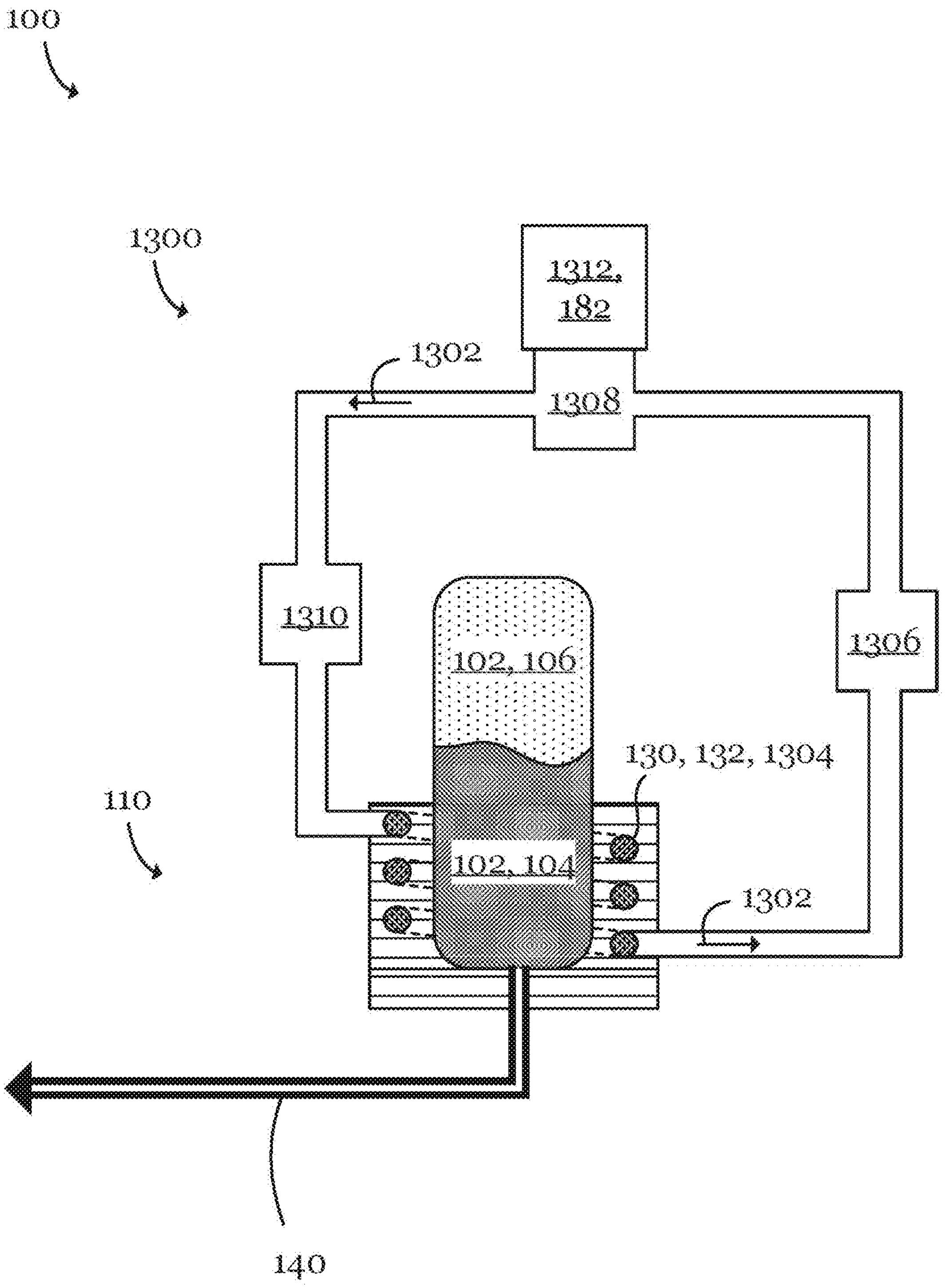
FIG. 13 illustrates exemplary features of a thermal loop of the thermal system.

Fluid storage tank 120 (i.e., fluid vessel no) can be heated with refrigerant other than cooling fluid 102. Referring to FIG. 13, first heat exchanger 130 can be an aspect of a closed thermal loop 1300 employing a refrigerant 1302 (e.g., water, R-22) as a heat exchange medium (i.e., as a working or cooling fluid). Thermal loop 1300 can include a mechanical pump 1310 (e.g., a liquid pump, a gas compressor), a refrigerant condenser 130, 1304, a refrigerant expander 1306 (which can be absent when, for example, mechanical pump 1310 is a liquid pump), and a refrigerant evaporator 1308. According to some embodiments, refrigerant evaporator 1308. Refrigerant evaporator 1308 can be in thermal communication with a heat source 1312. Heat source 1312 can be heat producing element 182.

Figure 14:
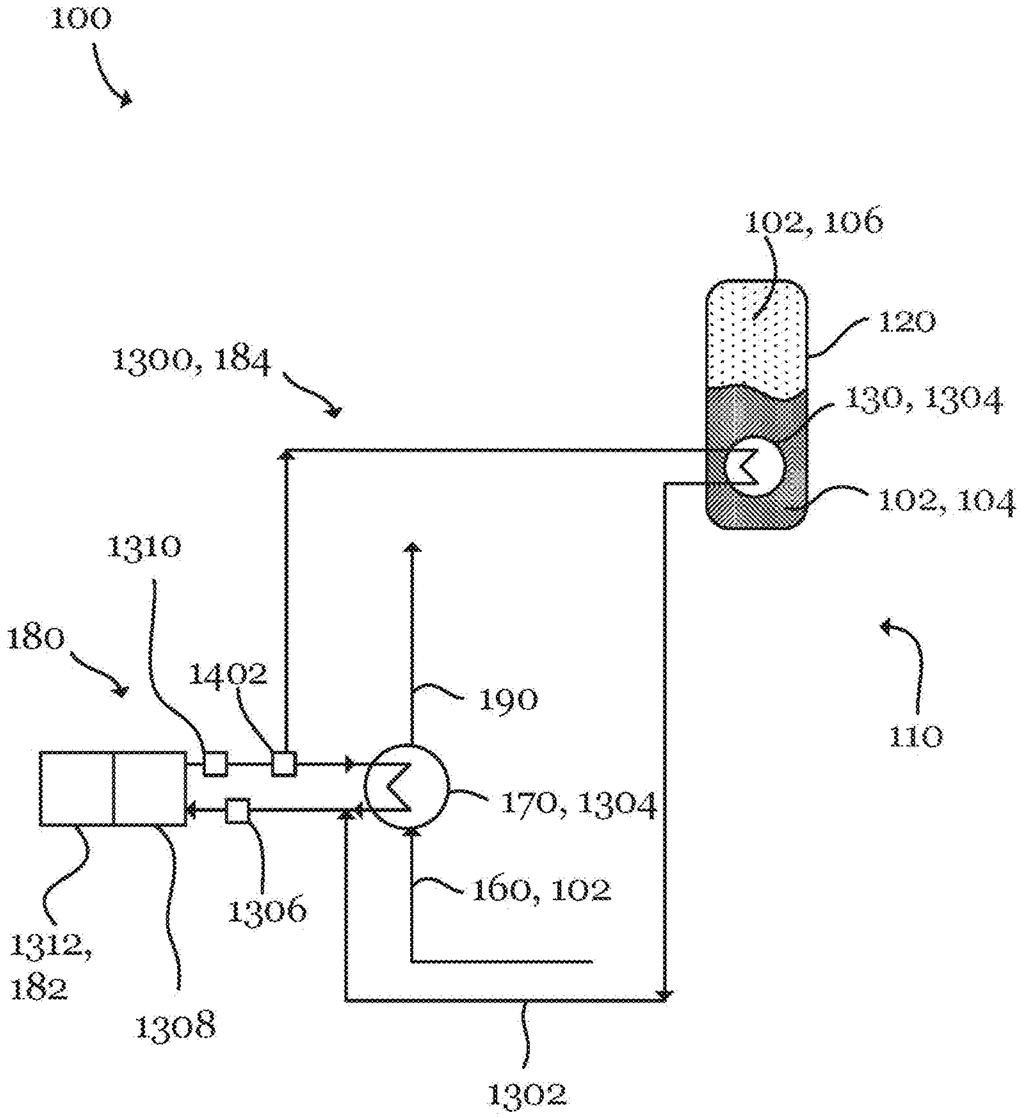
FIG. 14 illustrates exemplary features of the thermal loop.

According to some embodiments, and as shown in FIG. 14, thermal loop 1300 can be closed loop 184 and second heat exchanger 170 can be provided in parallel with first heat exchanger 130 (i.e., refrigerant condenser 1304). Three-way valve 1402 can control the proportion of fluid diverted into second heat exchanger 170 versus the proportion of fluid diverted into first heat exchanger 130. Refrigerant expander 1306 (e.g., an expansion valve) can be provided directly upstream of evaporator 1308. Both first heat exchanger 130 and second heat exchanger 170 can serve as condensers 1304 of refrigerant 1302 and evaporators of cooling fluid 102.

Figure 15:
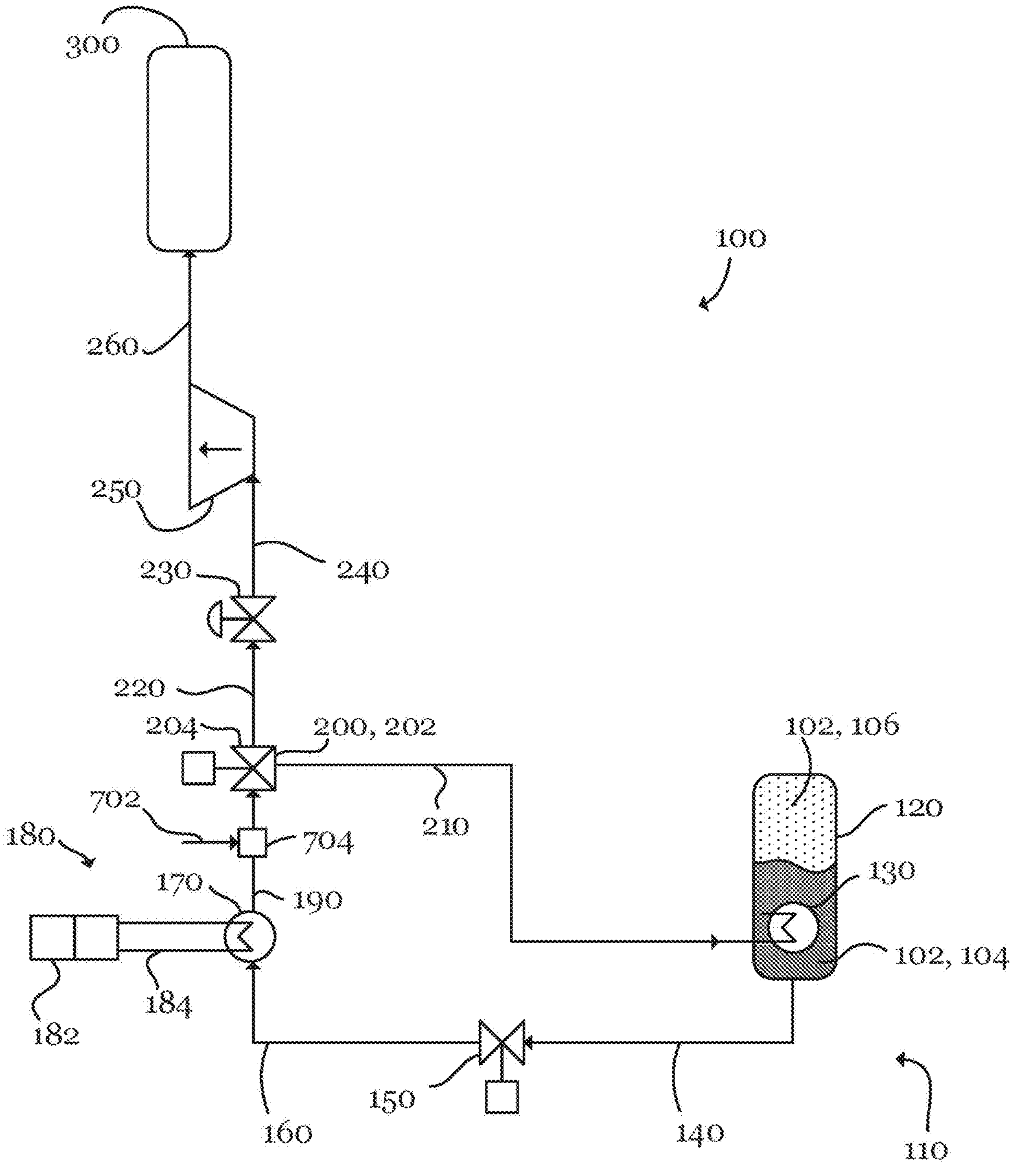
FIG. 15 illustrates an exemplary feature of the thermal system, including an exemplary combustor position.
Figure 16:
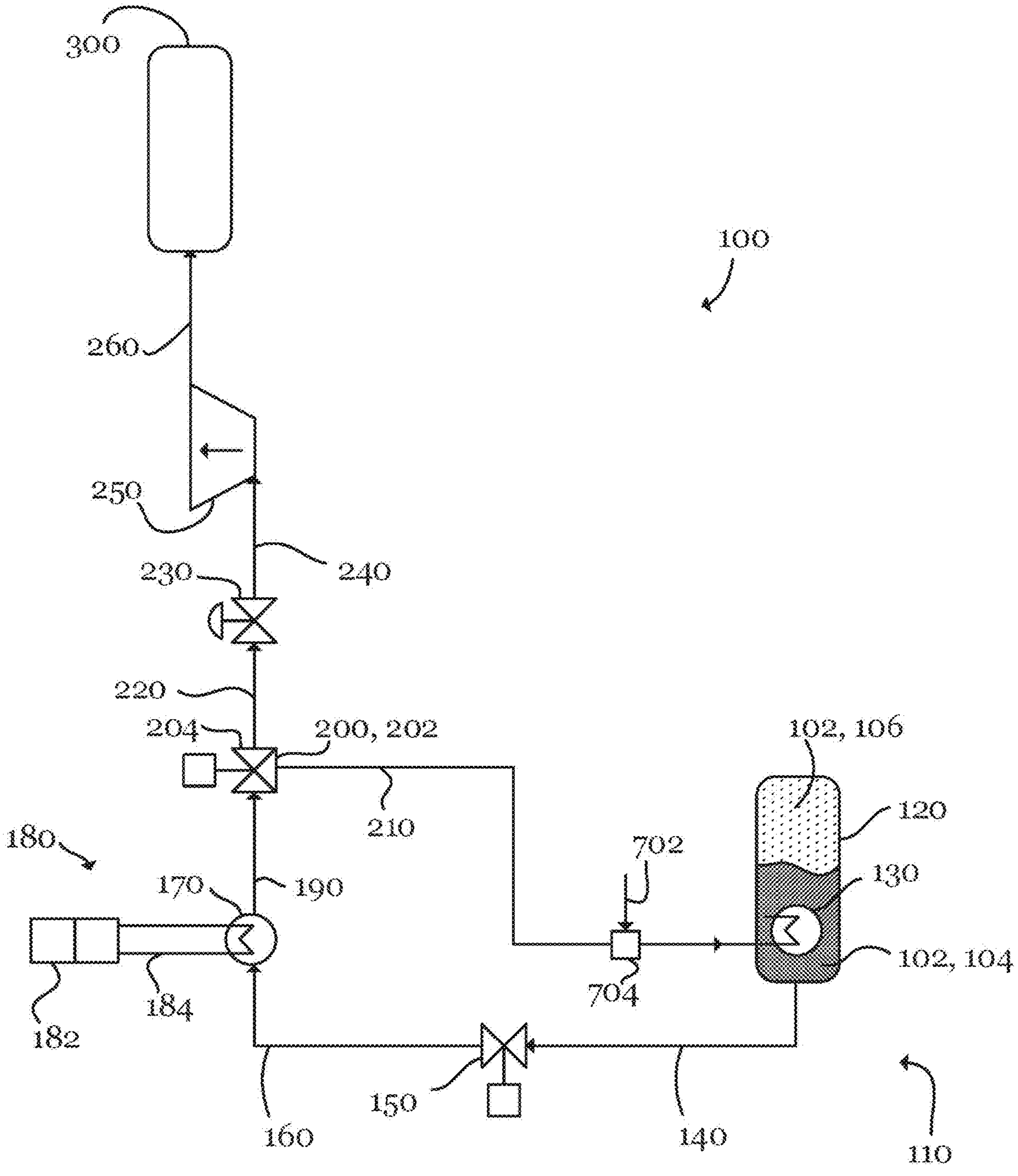
FIG. 16 illustrates an exemplary feature of the thermal system, including an exemplary combustor position.
Figure 17:
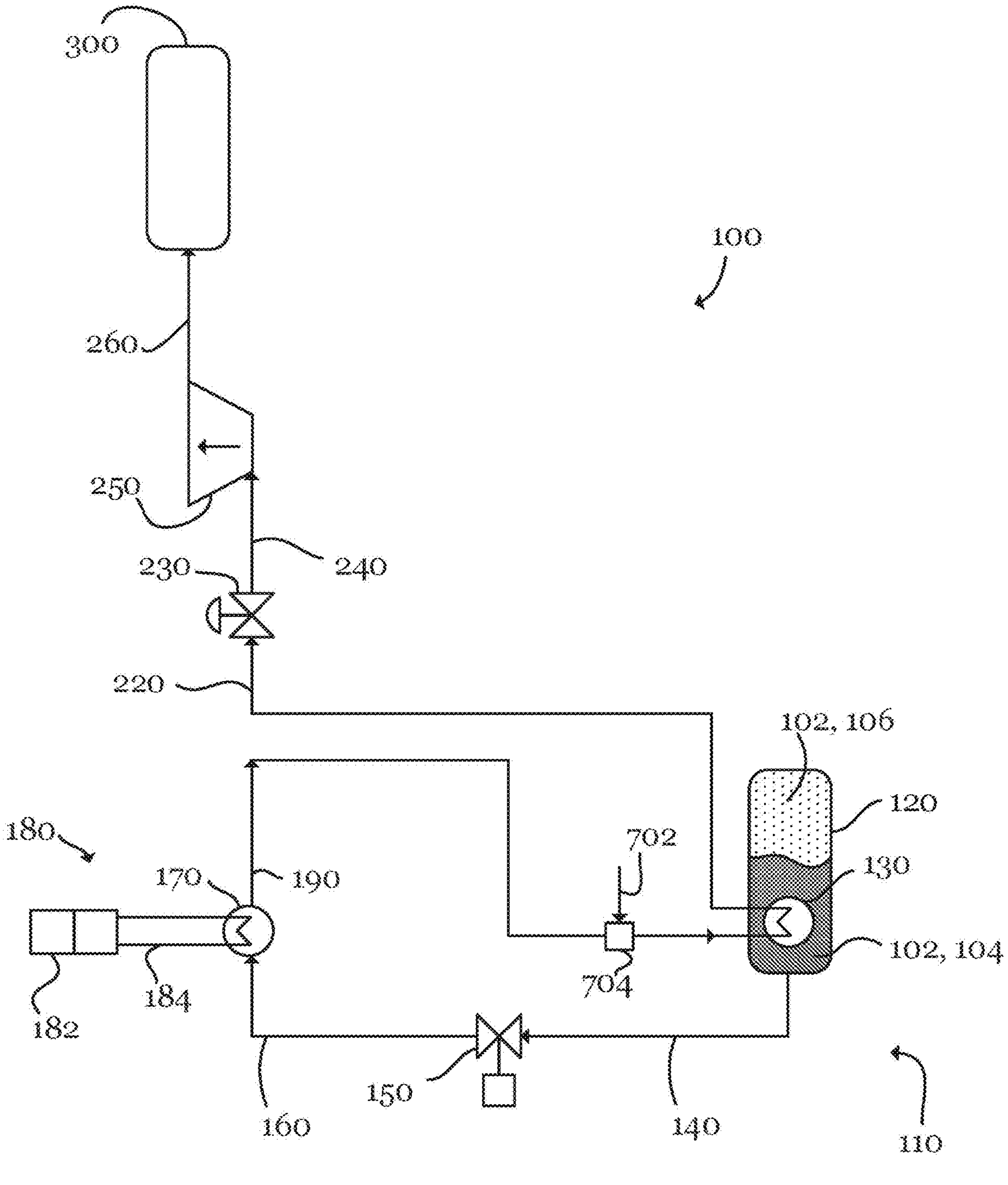
FIG. 17 illustrates an exemplary feature of the thermal system, including an exemplary combustor position.

Referring to FIGS. 7 and 15, oxygen source 702 and combustor 704 can be disposed fluidly upstream of first heat exchanger 130 in line 190. Alternatively, or in addition, and as shown in FIG. 16, oxygen source 702 and combustor 704 can be disposed fluidly upstream of first heat exchanger 130 in line 210 (if, for example, combusted cooling fluid 102 *b* is not intended to entire turbine 250). As shown in FIG. 17, three-way valve 200 can be omitted such that first heat exchanger 130 is in-series-with, and fluidly upstream of, turbine 250. According to some embodiments, cooling fluid 102 is oxygen and oxygen source 702 is replaced with a fuel source.

Figure 8:
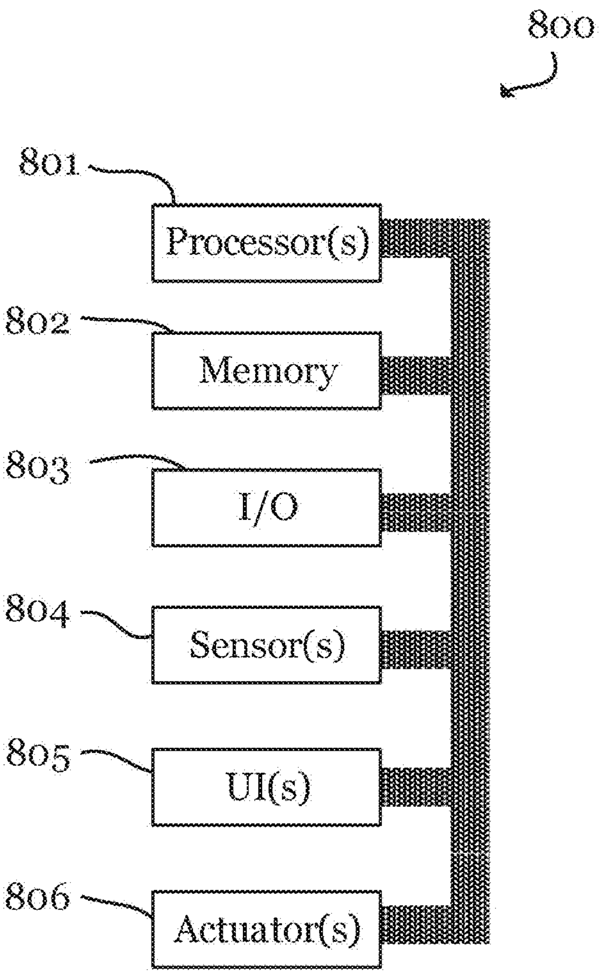
FIG. 8 is a block diagram of an exemplary processing system of the thermal system.

Referring to FIG. 8, thermal system 100 can include a processing system 800. Processing system 800 can include one or more processors 801, memory 802, one or more input/output devices 803, one or more sensors 804, one or more user interfaces 805, and one or more actuators 806.

Processors 801 can include one or more distinct processors, each having one or more cores. Each of the distinct processors can have the same or different structure. Processors 801 can include one or more central processing units (CPUs), one or more graphics processing units (GPUs), circuitry (e.g., application specific integrated circuits (ASICs)), digital signal processors (DSPs), and the like. Processors 801 can be mounted on a common substrate or to different substrates.

Processors 801 are configured to perform a certain function, method, or operation at least when one of the one or more of the distinct processors is capable of executing code, stored on memory 802 embodying the function, method, or operation. Processors 801 can be configured to perform any and all functions, methods, and operations disclosed herein.

For example, when the present disclosure states that processing 800 performs/can perform task “X” (e.g., task “X is performed”), such a statement should be understood to disclose that processing system 800 can be configured to perform task “X”. Thermal system 100 and processing system 800 are configured to perform a function, method, or operation at least when processors 801 are configured to do the same. As used herein the term “determine”, when used in conjunction with processing 800 can mean detecting, receiving, looking-up, computing, and the like.

Memory 802 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 802 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 802.

Input-output devices 803 can include any component for trafficking data such as ports, antennas (i.e., transceivers), printed conductive paths, and the like. Input-output devices 803 can enable wired communication via USB®, DisplayPort®, HDMI®, Ethernet, and the like. Input-output devices 803 can enable electronic, optical, magnetic, and holographic, communication with suitable memory 803. Input-output devices can enable wireless communication via WiFi®, Bluetooth®, cellular (e.g., LTE®, CDMA®, GSM®, WiMax®, NFC®), GPS, and the like. Input-output devices 803 can include wired and/or wireless communication pathways.

Sensors 804 can capture physical measurements of environment and report the same to processors 801. Examples of sensors 804 include temperature sensors, pressure sensors, rotational speed sensors, voltage sensors, current sensors, etc. According to some embodiments, a temperature and/or pressure sensor is disposed at any (e.g., every) point in thermal system 100. According to some embodiments, a voltage sensor and current sensor are disposed on line 640.

User interface 805 can include a display (e.g., LED touchscreens (e.g., OLED touchscreens), physical buttons, speakers, microphones, keyboards, and the like. Actuators 806 can enable processors 801 to control mechanical forces. Every valve disclosed herein can be an independently controllable actuator 806.

Processing system 800 can be distributed (e.g., primary non-volatile memory can be disposed in a first remote server and the other modules can be disposed in a second remote server). Processing system 800 can have a modular design where certain modules have a plurality of the features shown in FIG. 8. For example, one module can include one or more processors 801, memory 802, I/O 803, and sensors 804.

FIGS. 9-12 show various control operations as block diagrams. Processing system 800 can be configured to perform each of the control operations. Processing system 800 can perform any (e.g., all) of the control operations simultaneously (e.g., in parallel). As stated above, a temperature and/or pressure sensor can be disposed at any and/or every location in thermal system 100. Any measured property discussed herein (e.g., temperature, pressure, rotational speed, energy, etc.) can be replaced with the term "metric". As shown in FIGS. 9-12, the control operations can perpetually loop. The disclosed control algorithms (i.e., methods) disclosed can be applied to any embodiment of thermal system 100.

Figure 9:
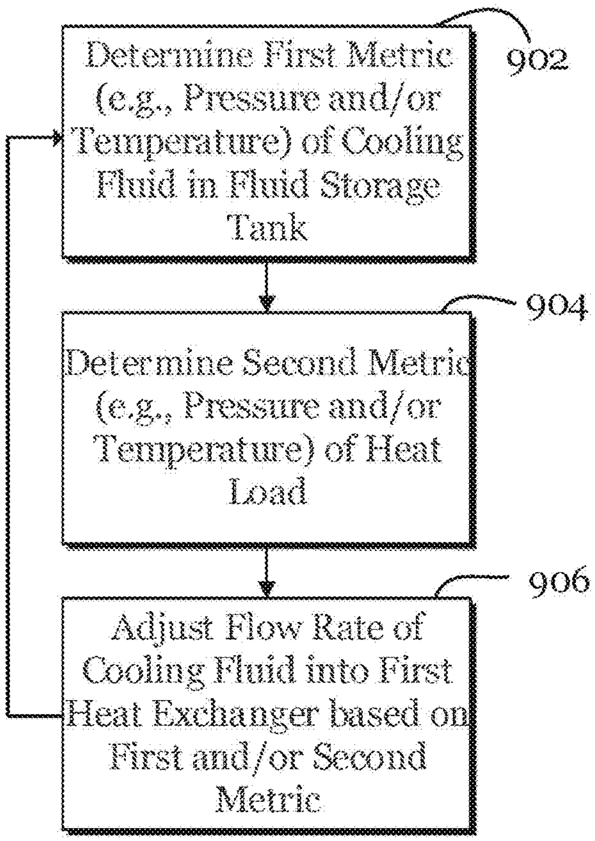
FIG. 9 is a block diagram of an exemplary method executed by the processing system.

Referring to FIGS. 1 and 9, and at block 902, processing system 800 ("PS 800") can measure (i.e., determine) a first metric (e.g., pressure and/or temperature) of cooling fluid 102 (e.g., gas phase cooling fluid 106) in fluid storage tank 120 (i.e., in vessel 110). At block 904, PS 800 can determine a second metric (e.g., a temperature) of heat load 180 (i.e., energy consumption device 320). The second metric can be a temperature of heat producing device 182. The second metric can be a temperature and/or pressure of the refrigerant within closed loop 184.

At block 906, PS 800 can adjust a flow rate of cooling fluid 102 (which can be un-combusted cooling fluid 102 *a* or combusted cooling fluid 102 *b*), into heat exchanger 130. PS 800 can perform the adjustment based on the first metric and/or the second metric. For example, PS 800 can increase a flow rate of cooling fluid 102 toward first heat exchanger 130 based on the temperature of heat load 180 exceeding a predetermined temperature.

PS 800 can modulate the follow rate of cooling fluid 102 toward first heat exchanger 130 by modulating the opening degree of first exit 202 of three way valve 200 (e.g., three-way valve 200 *a* and/or three-way valve 200 *b*). Put differently, PS 800 can increase and decrease a flow rate of cooling fluid 102 into first heat exchanger 130 (cooling fluid 102 can be combusted cooling fluid) to maintain a desired metric (e.g., temperature, pressure, liquid to gas ratio) of cooling fluid 102 resident in fluid storage tank 120 (i.e., vessel 110). PS 800 can achieve the same effect (i.e., controlling the flow rate of cooling fluid 102 into first heat exchanger 130) by modulating the opening degree of second exit 204 of three-way valve 200.

Figure 10:
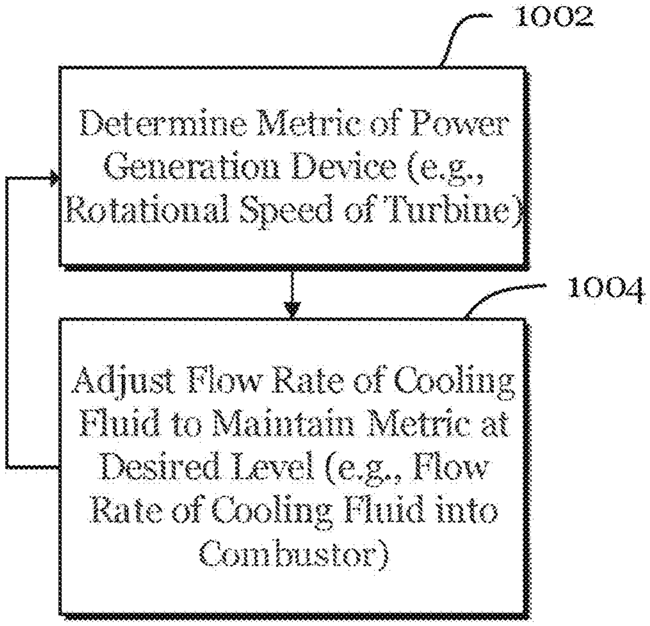
FIG. 10 is a block diagram of an exemplary method executed by the processing system.

Referring to FIGS. 1 and 10, and at block 1002, PS 800 can determine (e.g., measure) a metric of turbine 250 (e.g., rotational speed, power generated at coil 630). Put differently, PS 800 can determine a metric of power generation device 310. At block 1004, PS 800 can adjust (i.e., increase or decrease) a flow rate of cooling fluid 102 to maintain the metric at a desired level. The flow rate can be flow rate of uncombusted cooling fluid 102, 102 *a* into combustor 704 (see FIG. 7). Alternatively, or in addition, the flow rate can be the flow rate of cooling fluid 102 out of vessel 110 and into second heat exchanger 170. Alternatively, or in addition, the flow rate can be the flow rate of cooling fluid 102 into first heat exchanger 130 from line 210 (e.g., from line 210 *b*).

Figure 11:
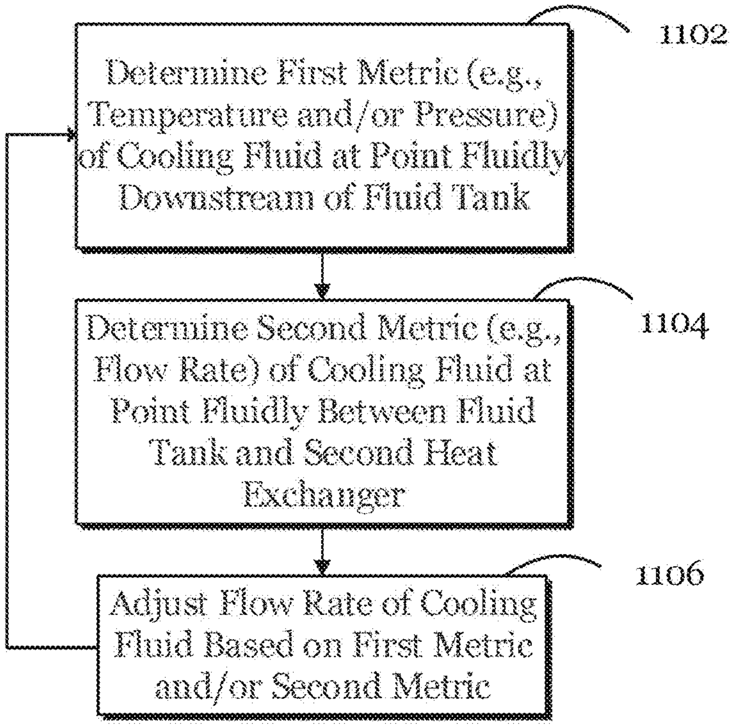
FIG. 11 is a block diagram of an exemplary method executed by the processing system.

Referring to FIGS. 1 and 11, and at block 1102, PS 800 can determine a first metric (e.g., temperature and/or pressure) of cooling fluid 102 at a point fluidly downstream of cooling fluid tank 120 (e.g., in line 160 and/or line 190). At block 1104, PS 800 can determine a second metric (e.g., flow rate) of cooling fluid 102 at a point fluidly downstream of cooling fluid tank 120 and fluidly upstream of second heat exchanger 170 (e.g., in line 160). At block 1106, PS 800 can adjust the flow rate of cooling fluid 102 into first heat exchanger 130 from line 210 (e.g., by modulating the opening degree of three-way valve exit 202 (e.g., exit 202 *a* and/or exit 202 *b*) based on the first metric and/or the second metric.

Figure 12:
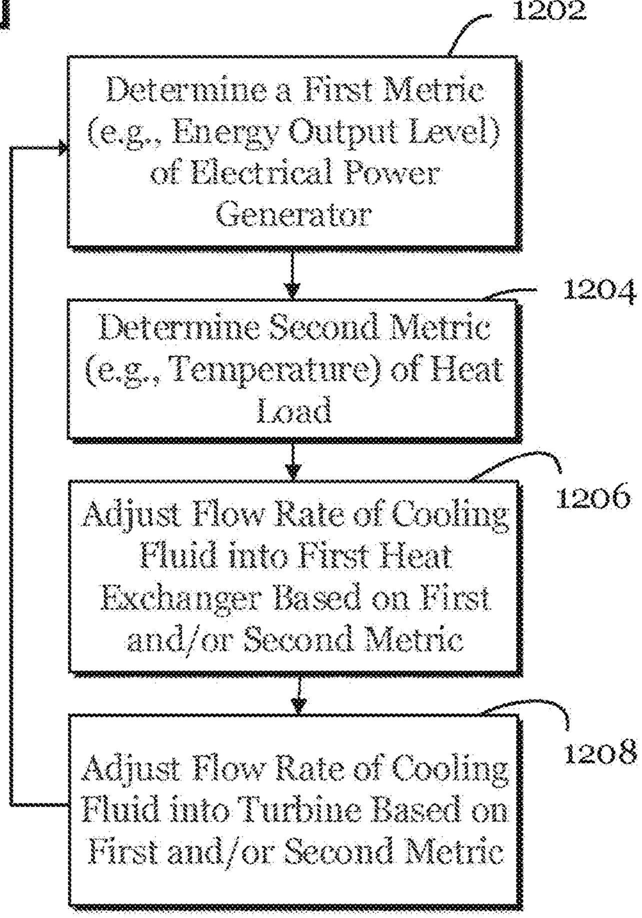
FIG. 12 is a block diagram of an exemplary method executed by the processing system.

Referring to FIGS. 1 and 12, and at block 1202, PS 800 can determine an energy output level (i.e., a first metric) of electrical power generator 310. At block 1204, PS Boo can determine a second metric such as a temperature of heat load 180 (e.g., a temperature of heat producing element 182, a temperature of refrigerant in closed loop 184, etc.).

At block 1206, PS 800 can increase and/or decrease a flow rate of cooling fluid 102 into first heat exchanger 130 based on the first metric and/or the second metric. PS 800 can do so by modulating an opening degree of first exit 202 (e.g., first exit 202 *a* and/or first exit 202 *b*). At block 1208, PS 800 can increase and/or decrease a flow rate of cooling fluid 102 (e.g., un-combusted 102 *a* or combusted 102 *b*) into turbine 250 (i.e., into electrical power generator 310) based on the first metric and/or the second metric. PS 800 can do so by modulating an opening degree of second exit 204 and/or by modulating pressure control valve 230.

Referring to FIG. 14, PS 800 can control flow rate of refrigerant 1302 into first heat exchanger 130 (e.g., by modulating valve 1402 and/or mechanical pump 1310) based on a desired flow rate of cooling fluid 102 through line 190. PS 800 can control flow rate of refrigerant 1302 into first heat exchanger 130 (e.g., by modulating valve 1402 and/or mechanical pump 1310) based on one or more of: (a) a desired flow rate of cooling fluid 102 through line 160 or line 190, (b) a desired temperature of heat producing element 182, (c) a desired temperature/pressure of cooling fluid 102 in line 160, (d) a desired temperature/pressure of cooling fluid 102 in line 190, and/or (e) a metric of turbine 150 (e.g., a metric of electrical apparatus 600 such as turbine 150 rotational speed, electrical output of power generation device 310, electrical demand of power consumption device 320 (e.g., heat producing element 182)). PS 800 can control flow rate of refrigerant 1302 into second heat exchanger 170 based on one or more of the same metrics.

PS 800 can control the flow rate of cooling fluid 102 into second heat exchanger 170 (e.g., by modulating flow control valve 150) to ensure that cooling fluid in lines 190 and/or 210 (e.g., cooling fluid 102 entering first heat exchanger 130) is in a super-heated state. PS 800 can modulate pressure control valve 230 to maintain a predetermined saturation pressure and/or temperature of cooling fluid 102 within second heat exchanger 170 and/or first heat exchanger 130.

Example 1. A thermal system can include a fluid storage tank configured to store a first cooling fluid in a liquid state and a gas state; a first heat exchanger configured to release heat into the fluid storage tank; a second heat exchanger arranged fluidly downstream of the fluid storage tank and configured to exchange heat between the first cooling fluid and a heat load; and a pressure control device arranged fluidly downstream of the second heat exchanger, one of the first cooling fluid that has been heated by the second heat exchanger or a second cooling fluid different than the first cooling fluid passes through the first heat exchanger and thereby heats upstream first cooling fluid resident in the fluid storage tank.

Example 2. In the thermal system of Example 1, the first heat exchanger is arranged fluidly downstream of the second heat exchanger and is configured to receive the first cooling fluid from the second heat exchanger, the first cooling fluid having been heated by the second heat exchanger, and the first heat exchanger is configured to expel the first cooling fluid to a location downstream of the pressure control device.

Example 3. In the thermal system of Example 2, the pressure control device is fluidly connected to the second heat exchanger via a first line, and a second line is fluidly connected to the first line between the pressure control device and the second heat exchanger and extending from the first line to the first heat exchanger so as to fluidly transport the first cooling fluid from the second heat exchanger to the first heat exchanger.

Example 4. In the thermal system of Example 3, a third line fluidly extends away from the pressure regulator, and a fourth line fluidly extends from the first heat exchanger and fluidly connects to the third line downstream of the pressure control device so as to enable the first heat exchanger to expel the first cooling fluid to a location downstream of the pressure control device.

Example 5. The thermal system of Example 4 can include a turbine arranged fluidly downstream of the pressure control device, the third line includes a first portion that fluidly extends from the pressure control device to the turbine, and the turbine is configured to extract mechanical energy from the first cooling fluid flowing therein.

Example 6. The thermal system of Example 5 can include a three-way valve arranged fluidly downstream of the turbine, the third line includes a second portion that fluidly extends from the turbine to the three-way valve, and the fourth line is fluidly connected to the three-way valve.

Example 7. In the thermal system of Example 6, the three-way valve expels the first cooling fluid received from the turbine and the first cooling fluid received from fourth line to an exhaust.

Example 8. In the thermal system of any of Examples 1-7, the first heat exchanger is configured to receive the second cooling fluid from a heat producing element, the second cooling fluid having been heated by the heat producing element, and a closed loop line is fluidly connected to the first heat exchanger and the heat producing element and is configured to continuously fluidly transport the second cooling fluid from the heat producing element, to the first heat exchanger, away from the first heat exchanger, and back to the heat producing element such that the second cooling fluid is repeatedly heated by the heat producing element and subsequently transported to the first heat exchanger so as to heat upstream first cooling fluid resident in the fluid storage tank.

Example 9. In the thermal system of Example 8, a fifth line of the closed loop line fluidly connects the heat producing element to an inlet of the first heat exchanger, and a sixth line of the closed loop line fluidly connects an outlet of the first heat exchanger to the heat producing element.

Example 10. In the thermal system of Example 9, a pump is arranged along the fifth line and is configured to pump the second cooling fluid through the closed loop line.

Example 11. In the thermal system of Example 9, the first heat exchanger includes a coiled tube that wraps about an outer circumference of the fluid storage tank.

Example 12. The thermal system of Examples 1-11 can include a processing system configured to increase and decrease a flow rate of the first cooling fluid into the first heat exchanger based on (a) a temperature and/or a pressure of the first cooling fluid at a point fluidly downstream of the fluid storage tank and fluidly upstream of the second heat exchanger and (b) a flow rate of the first cooling fluid at a point fluidly downstream of the fluid storage tank and fluidly upstream of the second heat exchanger.

Example 13. A method can include providing a fluid storage tank configured to store a first cooling fluid in a liquid state and a gas state; providing a first heat exchanger configured to release heat into the fluid storage tank; arranging a second heat exchanger fluidly downstream of the fluid storage tank and configured to exchange heat between the first cooling fluid and a heat load; arranging a pressure control device fluidly downstream of the second heat exchanger; and directing one of the first cooling fluid that has been heated by the second heat exchanger or a second cooling fluid different than the first cooling fluid through the first heat exchanger so as to heat upstream first cooling fluid resident in the fluid storage tank.

Example 14. The thermal system of Example 13 can include heating the first cooling fluid via the second heat exchanger, the first heat exchanger is arranged fluidly downstream of the second heat exchanger and is configured to receive the first cooling fluid from the second heat exchanger, the first cooling fluid having been heated by the second heat exchanger; and expelling the first cooling fluid from the first heat exchanger to a location downstream of the pressure control device.

Example 15. In the thermal system of Example 14, the pressure control device is fluidly connected to the second heat exchanger via a first line, and a second line is fluidly connected to the first line between the pressure control device and the second heat exchanger and extending from the first line to the first heat exchanger so as to fluidly transport the first cooling fluid from the second heat exchanger to the first heat exchanger.

Example 16. In the thermal system of Example 15, a third line fluidly extends away from the pressure regulator, and a fourth line fluidly extends from the first heat exchanger and fluidly connects to the third line downstream of the pressure control device so as to enable the first heat exchanger to expel the first cooling fluid to a location downstream of the pressure control device.

Example 17. The thermal system of Example 16 can include heating the second cooling fluid via a heat producing element, the first heat exchanger is configured to receive the second cooling fluid from the heat producing element, the second cooling fluid having been heated by the heat producing element, and a closed loop line is fluidly connected to the first heat exchanger and the heat producing element; and continuously fluidly transporting, via the closed loop line, the second cooling fluid from the heat producing element, to the first heat exchanger, away from the first heat exchanger, and back to the heat producing element such that the second cooling fluid is repeatedly heated by the heat producing element and subsequently transported to the first heat exchanger so as to heat upstream first cooling fluid resident in the fluid storage tank.

Example 18. A thermal system can include a fluid storage tank configured to store a first cooling fluid in a liquid state and a gas state; a first heat exchanger configured to release heat into the fluid storage tank; a second heat exchanger arranged fluidly downstream of the fluid storage tank and configured to exchange heat between the first cooling fluid and a heat load; and a pressure control device arranged fluidly downstream of the second heat exchanger, a fluid line extends away from the pressure control device toward an exhaust, one of the first cooling fluid that has been heated by the second heat exchanger or a second cooling fluid different than the first cooling fluid passes through the first heat exchanger and thereby heats upstream first cooling fluid resident in the fluid storage tank, and the first heat exchanger includes an inlet configured to receive one of the first cooling fluid or the second cooling fluid and an outlet configured to expel the one of the first cooling fluid or the second cooling fluid after the one of the first cooling fluid or the second cooling fluid has heated the upstream first cooling fluid resident in the fluid storage tank.

Example 19. In the thermal system of Example 18, the first heat exchanger is arranged fluidly downstream of the second heat exchanger and is configured to receive the first cooling fluid from the second heat exchanger via the inlet, the first cooling fluid having been heated by the second heat exchanger, and the first heat exchanger is configured to expel the first cooling fluid via the outlet to a location downstream of the pressure control device along the fluid line.

Example 20. In the thermal system of Example 18, the first heat exchanger is configured to receive the second cooling fluid from a heat producing element via the inlet, the second cooling fluid having been heated by the heat producing element, and a closed loop line is fluidly connected to the first heat exchanger and the heat producing element and is configured to continuously fluidly transport the second cooling fluid from the heat producing element, to the inlet of the first heat exchanger, away from the first heat exchanger via the outlet, and back to the heat producing element such that the second cooling fluid is repeatedly heated by the heat producing element and subsequently transported to the first heat exchanger so as to heat upstream first cooling fluid resident in the fluid storage tank.

What is claimed is:

1. A thermal system comprising:

a fluid storage tank configured to store a cooling fluid in a liquid state and a gas state;

a first heat exchanger configured to release heat into the fluid storage tank;

a second heat exchanger, the second heat exchanger being fluidly downstream of the fluid storage tank, the second heat exchanger being configured to exchange heat between the cooling fluid and a heat load;

a turbine arranged fluidly downstream of the second heat exchanger, the turbine configured to extract mechanical energy from the cooling fluid flowing therein;

a first three-way valve arranged fluidly downstream of the turbine to direct a first portion of the cooling fluid received from the turbine to an exhaust and a second portion of the cooling fluid received from the turbine to the first heat exchanger; and a combustor arranged fluidly upstream of the turbine and fluidly downstream of the second heat exchanger, wherein the cooling fluid that has been heated by the second heat exchanger passes through the first heat exchanger and thereby heats upstream cooling fluid resident in the fluid storage tank, and wherein the combustor is configured to ignite the cooling fluid flowing from the second heat exchanger such that combusted cooling fluid flows through and drives the turbine.

2. The thermal system of claim 1, further comprising:

a second three-way valve fluidly upstream of the first heat exchanger and fluidly downstream of the second heat exchanger, the second three-way valve being configured to direct the cooling fluid, after being heated by the heat load, toward the first heat exchanger and toward the turbine.

3. The thermal system of claim 2, wherein the second three-way valve comprises:

an entrance, which receives the cooling fluid from the second heat exchanger;

a first exit, which leads toward the first heat exchanger such that a first portion of the cooling fluid received from the second heat exchanger is directed toward the first heat exchanger via the first exit; and a second exit, which leads toward the turbine such that a second portion of the cooling fluid received from the second heat exchanger is directed toward the turbine via the second exit.

4. The thermal system of claim 3, further comprising:

a first fluid line extending from the second exit of the second three-way valve to the turbine, wherein the combustor is arranged along the first fluid line such that the second portion of the cooling fluid flowing from the second exit is ignited by the combustor and flows through and drives the turbine.

5. The thermal system of claim 4, further comprising:

a pressure control device arranged fluidly downstream of the second heat exchanger along the first fluid line.

6. The thermal system of claim 5, wherein the pressure control device is arranged fluidly upstream of the combustor and fluidly downstream of the second three-way valve.

7. The thermal system of claim 1, wherein the turbine is an aspect of an electrical power generator, the electrical power generator configured to convert mechanical energy supplied by the turbine into electrical energy, and wherein the heat load further comprises heat produced during consumption of and/or generation of the electrical energy.

8. The thermal system of claim 1, further comprising:

a processing system configured to increase and decrease a flow rate of the cooling fluid arranged downstream of the second heat exchanger into the first heat exchanger to maintain a desired metric of the cooling fluid resident in the fluid storage tank, the desired metric being a temperature of the resident cooling fluid, a pressure of the resident cooling fluid, or a gas to liquid ratio of the resident cooling fluid.

9. The thermal system of claim 8, wherein the processing system is further configured to increase and decrease a flow rate of the cooling fluid into the first heat exchanger to maintain a desired metric of the turbine.

10. The thermal system of claim 9, wherein the desired turbine metric is a rotational speed.

11. A thermal system comprising:

a fluid storage tank configured to store a cooling fluid in a liquid state and a gas state;

a first heat exchanger configured to release heat into the fluid storage tank;

a second heat exchanger, the second heat exchanger being fluidly downstream of the fluid storage tank, the second heat exchanger being configured to exchange heat between the cooling fluid and a heat load;

a turbine arranged fluidly downstream of the second heat exchanger, the turbine configured to extract mechanical energy from the cooling fluid flowing therein; and a combustor arranged fluidly upstream of the turbine and fluidly downstream of the second heat exchanger, wherein the cooling fluid that has been heated by the second heat exchanger passes through the first heat exchanger and thereby heats upstream cooling fluid resident in the fluid storage tank, wherein the combustor is configured to ignite the cooling fluid flowing from the second heat exchanger, and wherein a first portion of the combusted cooling fluid flows through and drives the turbine and a second portion of the combusted cooling fluid flows through the first heat exchanger to heat upstream cooling fluid resident in the fluid storage tank.

12. The thermal system of claim 11, further comprising:

a three-way valve fluidly upstream of the first heat exchanger and fluidly downstream of the second heat exchanger, the three-way valve being configured to direct the cooling fluid, after being heated by the heat load, toward the first heat exchanger and toward the turbine.

13. The thermal system of claim 12, wherein the three-way valve comprises:

an entrance, which receives the cooling fluid from the second heat exchanger;

a first exit, which leads toward the first heat exchanger; and a second exit, which leads toward the turbine.

14. The thermal system of claim 13, further comprising:

a first fluid line extending from the second heat exchanger to the entrance of the three-way valve, wherein the combustor is arranged along the first fluid line, wherein the first exit directs the second portion of the combusted cooling fluid to the first heat exchanger such that the second portion flows through the first heat exchanger to heat upstream cooling fluid resident in the fluid storage tank, and wherein the second exit directs the first portion of the combusted cooling fluid to the turbine such that the second portion flows through and drives the turbine.

15. The thermal system of claim 14, further comprising:

a pressure control device arranged fluidly downstream of the three-way valve between the three-way valve and the turbine.

16. The thermal system of claim 11, further comprising:

an oxygen source arranged fluidly upstream of the combustor, the thermal system being configured to mix oxygen dispensed from the oxygen source with the cooling fluid and to combust the mixture in the combustor.

17. A method comprising:

storing a cooling fluid in a fluid storage tank in a liquid state and a gas state;

providing a first heat exchanger configured to release heat into the fluid storage tank;

arranging a second heat exchanger fluidly downstream of the fluid storage tank;

receiving the cooling fluid in the second heat exchanger to exchange heat between the cooling fluid and a heat load;

arranging a turbine fluidly downstream of the second heat exchanger, the turbine configured to extract mechanical energy from the cooling fluid flowing therein;

arranging a combustor fluidly upstream of the turbine and fluidly downstream of the second heat exchanger;

passing the cooling fluid that has been heated by the second heat exchanger through the first heat exchanger and thereby heating upstream cooling fluid resident in the fluid storage tank such that a portion of the upstream cooling fluid in the fluid storage tank in the liquid state is changed to the gas state to increase a pressure within the fluid storage tank;

forcing remaining upstream cooling fluid in the liquid state out of the fluid storage tank and toward the second heat exchanger due to the increased pressure; and igniting the cooling fluid flowing from the second heat exchanger and to the turbine in the combustor such that combusted cooling fluid flows through and drives the turbine.

18. The method of claim 17, further comprising:

arranging a three-way valve fluidly upstream of the first heat exchanger and fluidly downstream of the second heat exchanger, the three-way valve being configured to direct the cooling fluid, after being heated by the heat load, toward the first heat exchanger and toward the turbine.

19. The method of claim 18, further comprising:

receiving the cooling fluid from the second heat exchanger at an entrance of the three-way valve;

directing a first portion of the cooling fluid toward the first heat exchanger via a first exit of the three-way valve; and directing a second portion of the cooling fluid toward the turbine via a second exit of the three-way valve.

20. The method of claim 19, further comprising:

providing a first fluid line that extends from the second exit of the three-way valve to the turbine; and arranging the combustor along the first fluid line such that the second portion of the cooling fluid flowing from the second exit is ignited by the combustor and flows through and drives the turbine.

* * * * *